United States Patent
Zaks

(10) Patent No.: US 11,711,754 B2
(45) Date of Patent: *Jul. 25, 2023

(54) DYNAMIC FUNCTIONAL PARTITIONING FOR SECURITY PASS-THROUGH VIRTUAL NETWORK FUNCTION (VNF)

(71) Applicant: MAXLINEAR, INC., Carlsbad, CA (US)

(72) Inventor: Artur Zaks, Modiin (IL)

(73) Assignee: MaxLinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/403,775

(22) Filed: Aug. 16, 2021

(65) Prior Publication Data

US 2021/0385736 A1    Dec. 9, 2021

Related U.S. Application Data

(63) Continuation of application No. 16/462,647, filed as application No. PCT/US2016/068097 on Dec. 21, 2016, now Pat. No. 11,096,119.

(51) Int. Cl.
*G06F 9/455* (2018.01)
*H04L 9/40* (2022.01)
(Continued)

(52) U.S. Cl.
CPC ........ *H04W 48/16* (2013.01); *G06F 9/45537* (2013.01); *G06F 9/45558* (2013.01);
(Continued)

(58) Field of Classification Search
CPC .............................. G06F 9/455–45558; G06F 2009/45562–45595; H04L 9/001–50;
(Continued)

(56) References Cited

U.S. PATENT DOCUMENTS

| 10,555,171 B2 * | 2/2020 | Zaks | H04W 76/12 |
| 11,096,119 B2 * | 8/2021 | Zaks | H04W 48/16 |

(Continued)

FOREIGN PATENT DOCUMENTS

| EP | 2699051 A1 * | 2/2014 | H04L 12/4633 |
| WO | 2016193823 A1 | 12/2016 | |

OTHER PUBLICATIONS

International Search Report and Written Opinion dated Mar. 8, 2017 for PCT/US2016/068097.

(Continued)

*Primary Examiner* — Timothy J Weidner
(74) *Attorney, Agent, or Firm* — Buchalter; Jason W. Croft

(57) ABSTRACT

A network device or system can operate to enable a security pass-through with a user equipment (UE) and further define various virtual functions between a physical access point (pAP) and a virtual AP (vAP) based on one or more communication link parameters (e.g., latency). The security pass-through can be an interface connection that passes through a computer premise equipment (CPE) or wireless residential gateway (GW) without the CPE or GW modifying or affecting the data traffic such as by authentication or security protocol. The SP network device can receive traffic data from a UE through or via the security pass-through from a UE of a community Wi-Fi network at a home, residence, or entity network.

25 Claims, 9 Drawing Sheets

(51) Int. Cl.
  *H04L 12/46* (2006.01)
  *H04W 12/041* (2021.01)
  *H04W 12/069* (2021.01)
  *H04W 24/08* (2009.01)
  *H04W 48/06* (2009.01)
  *H04W 48/16* (2009.01)
  *H04W 76/15* (2018.01)
  *H04W 76/27* (2018.01)
  *H04W 84/02* (2009.01)
  *H04W 84/12* (2009.01)
  *H04W 88/00* (2009.01)
  *H04W 88/12* (2009.01)
  *H04W 92/02* (2009.01)
  *H04W 92/12* (2009.01)

(52) U.S. Cl.
  CPC ...... *H04L 12/4633* (2013.01); *H04L 12/4641* (2013.01); *H04L 63/0272* (2013.01); *H04L 63/10* (2013.01); *H04W 12/041* (2021.01); *H04W 12/069* (2021.01); *H04W 24/08* (2013.01); *H04W 48/06* (2013.01); *H04W 76/15* (2018.02); *H04W 76/27* (2018.02); *G06F 2009/45587* (2013.01); *G06F 2009/45595* (2013.01); *H04W 84/02* (2013.01); *H04W 84/12* (2013.01); *H04W 88/005* (2013.01); *H04W 88/12* (2013.01); *H04W 92/02* (2013.01); *H04W 92/12* (2013.01)

(58) Field of Classification Search
  CPC ..... H04L 12/28–2898; H04L 2012/2841–285; H04L 12/46–4695; H04L 63/02–308; H04W 12/009–80; H04W 24/02–10; H04W 48/02–20; H04W 76/10–50; H04W 80/02–12; H04W 84/005–22; H04W 88/005–188; H04W 92/02–24
  See application file for complete search history.

(56) References Cited

U.S. PATENT DOCUMENTS

2013/0104207 A1   4/2013   Kroeselberg et al.
2016/0212016 A1   7/2016   Vrzic et al.
2019/0313254 A1  10/2019  Zaks

OTHER PUBLICATIONS

Shao et al. IEEE 802.11 Medium Access Control (MAC) Profile for Control and Provisioning of Wireless Access Points (CAPWAP). Internet Engineering Task Force (IETF), Request for Comments: 7497, Category; Standards Track; ISSN: 2070-1721. Apr. 2015.

* cited by examiner

DYNAMIC FUNCTIONAL PARTITIONING FOR SECURITY PASS-THROUGH VIRTUAL NETWORK FUNCTION (VNF)

REFERENCE TO RELATED APPLICATION

This application is continuation of U.S. patent application Ser. No. 16/462,647, filed May 21, 2019 entitled "DYNAMIC FUNCTIONAL PARTITIONING FOR WIFI PROTECTED ACCESS 2 (WPA2) PASS-THROUGH VIRTUAL NETWORK FUNCTION (VNF)", which is a National Phase entry application of International Patent Application No. PCT/US2016/068097 filed Dec. 21, 2016 entitled "DYNAMIC FUNCTIONAL PARTITIONING FOR WiFi PROTECTED ACCESS 2 (WPA2) PASS-THROUGH VIRTUAL NETWORK FUNCTION (VNF)" in the name of Artur Zaks and is hereby incorporated by reference in its entirety.

FIELD

The present disclosure is in the field of security, and more specifically, pertains to a login engine and techniques for a secure and smart login.

BACKGROUND

Network Function Virtualization (NFV) involves the replacement of physical network nodes with Virtual Network Functions (VNFs) implemented via Virtualization Resources (VRs) that perform the same function as the physical node, or the physical Access Point (pAP). Community Wi-Fi service provides a guest Internet access over residential gateways (GWs) (e.g., a customer premise equipment (CPE), an access point (AP) of a CPE, a residential Access Node, residential gateway (GW), or the like) for customers of communication services provider (CoSP) when they are out of their home and within range of the residential gateway. Community Wi-Fi is enabled as an additional Wi-Fi network, which can be on top-of or in addition to other networks such as a residential home network for Internet access at the home, which can be provisioned over the residential gateway by the CoSP or service provider (SP).

DETAILED DESCRIPTION

Figure 1:
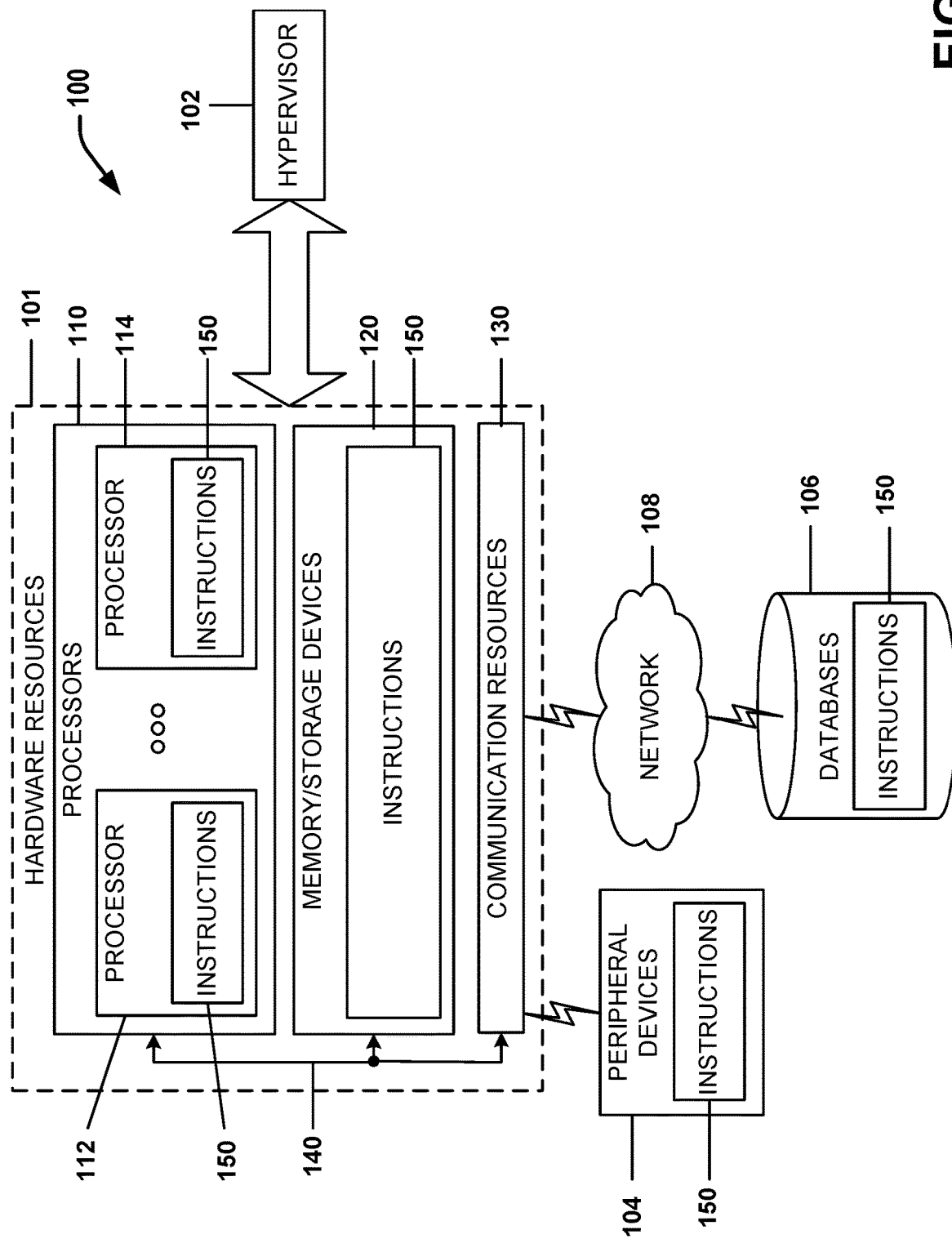
FIG. 1 is a diagram illustrating components of a network in accordance with one or more aspects or embodiments described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. INTRODUCTION In consideration of described deficiencies of radio frequency communications and authentication operations, various aspects for enabling a community Wi-Fi AP virtualized network function (VNF) with WiFi protected access 2 (WPA2) pass-through from a service provider (SP) network to a client device (e.g., a user equipment (UE), a mobile device, a wireless device, such as a wireless laptop or other wireless device, or other network device) are disclosed. Data traffic over a community Wi-Fi network can pass between mobile devices (or UEs) of a guest subscriber to an SP (e.g., a network provider of a cable, digital subscriber line (DSL), passive optic network (PON), or satellite network service) and to the SP network (a wide area network (WAN), or access to a WAN such as for an access to the Internet) via the community Wi-Fi pass-through, which means through or by the community Wi-Fi network at a home or residential gateway device (e.g., a customer premise equipment (CPE), physical AP, home/residential/business entity access node). The residential gateway (GW) can transparently pass data traffic of the community Wi-Fi network from the UE/wireless client to the SP network device of an SP network by means of, via, through, or by the WPA2 pass-through. The passage of data can be referred to as transparent in this case because the data traffic can be passed by the hosting wireless residential GW without modification, alteration, decryption or change by the associated home/residential GW to the SP network at an SP access point or virtual AP of the SP network, for example. In this sense the data traffic can pass transparently through (or via) a secured WPA2 pass-through as a connection interface from the UE to the SP network without the residential GW being enabled to change, decrypt or modify the data traffic. The data traffic can be sent or received by the UE or by the SP network device of an SP network as authenticated, protected and secure, using a Wi-Fi protected access 2 (WPA2) security in a secure connection, as the WPA2 pass-through.

Presently, when connected to the residential gateway, the clear text or unsecured traffic community Wi-Fi traffic can be tunneled and forwarded to the SP network over the WAN after an authenticated and secured connection is established with the residential GW. However, this can represent a vulnerability where a hosting user (or owner) of the residential GW could tap into the community Wi-Fi traffic and spoof communications from a guest subscriber using a UE or client of the SP network with the residential GW as a Hotspot, for example, or a pass-point in accordance with Wi-Fi Alliance standards. This vulnerability can be aggravated when a hosting home has a home network range extender connected to the residential GW using Ethernet or an Ethernet connection there-between. In this case, the data traffic could be sent in clear text over the Ethernet to the home residential GW and become even easier to spoof, even after authentication or security protocols are established between the range extender and the UE, for example.

In one example, an apparatus or system (e.g., an SP network device/component) of the SP network can be configured to be employed in/with a service provider (SP) network device/component (e.g., a processing device of a network server/a rack server or the like network device) with one or more processors, coupled to a memory that includes instructions to execute operations of the one or more processors. The SP network device, for example, can be configured to generate a WPA2 pass-through from the SP network to the UE or mobile device (user) without providing an opportunity for external breach or tampering at the ranger extender or the wireless residential GW at a home/entity hot spot or other CPE. The SP network device, for example, can initiate (or instantiate) the WPA2 pass-through as an interface that tunnels or flows from the SP network, through the CPE, and to a UE, as an end-to-end interface between the UE and the SP network device. As such, the SP network device can receive, via the WPA2 pass-through, a set of traffic data from the UE, wherein the set of traffic data is unmodified by the CPE, unmodified referring to not being decrypted, changed, or initially altered by the CPE/residential GW. The data traffic can be associated, in particular, with a community WiFi network of the CPE, which is separate from a residential network of the home or home owner that could be operational with other UEs at the wireless residential GW with a different basic service set identifier (BSSID) for example. Additional aspects, embodiments or details of the disclosure are further described below with detail in reference to figures.

FIG. 1 is a block diagram illustrating components of a system or network device 100, according to some example embodiments, able to read instructions from a machine-readable or computer-readable medium (e.g., a machine-readable storage medium) and perform any one or more of the functions, operations, processes or methodologies discussed herein. One or more components of the system or device 100 can be employed or utilized with, in or as a part of a user equipment (UE) (e.g., a mobile device, wireless device, or the like), a server provider network device/component (e.g., a network access node, network orchestrator, network server, rack server, network controller/processor, network data base, or the like), a computer premise equipment (CPE) (e.g., a router, residential/entity GW, access node, AP, basestation, evolved NodeB (eNB), or the like). Specifically, FIG. 1 illustrates a diagrammatic representation of hardware resources 101 that can be configured for use within the network device or system 100 including one or more processors (or processor cores) 110, one or more memory/storage devices 110, and one or more communication resources 130, each of which can be communicatively coupled via a communication link (e.g., a bus 140) or other connection (e.g., an optical link, wireless connection, wired connection, or other like communication connection).

For embodiments where node virtualization (can be utilized, as in a network function virtualization (NFV)) operation, a hypervisor 102 can be executed to provide an execution environment for one or more network slices/sub-slices to utilize the hardware resources 101. Such hypervisor 102, for example, can comprise a virtual machine monitor (VMM) that comprises a computer software, firmware or hardware resources, which create or execute on virtual machines to operate on a computer/processing device. Virtualization, as referred to herein, can be referred to as the removal of a function from a device (e.g., a CPE) and assigning or relocating the function to another device on a network either as software, firmware, specialized hardware or a combination thereof on the SP network for performing the similar or same function instead.

The processors 110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) can include, for example, a processor 112 and a processor 114. The memory/storage devices 110 can include main memory, disk storage, or any combination thereof.

The communication resources 130 can include interconnection and/or network interface components or other suitable devices to communicate with one or more peripheral devices 104 or one or more databases 106 via a network 108. For example, the communication resources 130 can include wired communication components (e.g., for coupling via a Universal Serial Bus (USB)), cellular communication components, Near Field Communication (NFC) components, Bluetooth® components (e.g., Bluetooth® Low Energy), Wi-Fi® (Wi-Fi/WiFi) components, and other communication components.

Instructions 150 can comprise software, a program, an application, an applet, an app, or other executable code for causing at least any of the processors 110 to perform any one or more of the methodologies discussed herein. The instructions 150 can reside, completely or partially, within at least one of the processors 110 (e.g., within the processor's cache memory), the memory/storage devices 110, or any suitable combination thereof. Furthermore, any portion of the instructions 150 can be transferred to the hardware resources 101 from any combination of the peripheral devices 104 and/or the databases 106. Accordingly, the memory of processors 110, the memory/storage devices 110, the peripheral devices 104, and the databases 106 are examples of computer-readable and machine-readable media.

In various embodiments, techniques/processes described herein can be employed to create, delete, or determine threshold(s) or parameters (e.g., latency, power, load, etc.) in connection with a VNF related virtualization resource (VR) performance measurement (PM), or to generate a notification of a crossing of such threshold(s) by one or more related parameters (e.g., latency, power, load, or other related parameters of a Wi-Fi standard such as an IEEE standard, Wi-Fi Alliance standard, 3GPP, or other standard). To enable security for UEs, provide flexibility for SP subscribers (UEs or users paying for SP internet or WAN access) operating among different Wi-Fi networks, including a community Wi-Fi network (e.g., a hotspot, hotspot 2.0, Wi-Fi passpoint, or other public community WiFi network) throughout residential or business entities, eliminate vulnerabilities, and optimize load balancing, between a residential (home/business/or other entity) gateway (GW) and an SP network, a WPA2 pass-through can be generated or enabled by an SP network device or SP network component with various components or elements as described herein. The WPA2 pass-through can be a communication link, interface, tunnel or other connection that passes through the wireless residential GW or CPE to a UE or wireless subscriber device with WPA2 encryption security and as an end-to-end point connection, for example.

In various embodiments discussed herein, an SP network component (e.g., the SP network device/component 200 of FIG. 2) of a service provider (e.g., a cable provider, DSL, PON or other network provider operable to provide a network or network service to a WAN/the Internet) can enable different/various home networks of a residential/entity GW or CPE, for example, including a community WiFi network with data traffic associated with a particular Basic Service Set (BSS) with layer 2 privacy through (via or by) the GW or CPE. In addition, the networks configured at the CPE, for example, can comprise different types/classes of networks enabling users access to the Internet. These networks that can be configured or enabled at the CPE (e.g., with a network router, ranger extender or other associated network devices/components in a home) and include networks such as a home access network (e.g., a personal area network (PAN)), a community Wi-Fi network that is managed by the SP (e.g., a hot spot (1.0/2.0) or passpoint with a wireless local area network (WLAN)), a local area network (LAN) or the like, in which each network can be associated with or correspond to a different BSSID, for example. Each network, for example, can comprise a pAP or a CPE (e.g., residential GW 240 of FIG. 2) dedicated to the residential/entity location for providing one or more networks at a single location/CPE/wireless residential GW or physical AP. One or more SP network devices or components (e.g., SP network device 202) can enable or facilitate virtualization of the Wi-Fi AP or the pAP, in which virtualization can be performed by means of NFV, which can refer to or mean taking a function typically associated with the hardware residential GW, CPE or pAP and moving this functionality away from the hardware to another location (e.g., away from the residential GW to the SP network). This affords an advantage of being able to provide better security and broader usage for users.

In one embodiment, an SP network device/component, for example, can virtualize the encryption for WPA2 security from the pAP to an SP network component of the SP network and enable the WPA2 pass-through to one or more UEs. Each UE, for example can be independently established with a connection/access at the home pAP as part of or independently with the SP network as a guest of the home pAP. For example, a home/residential network can be different from a community Wi-Fi network or hot spot at the pAP. Both network can be access by the UE, but the community WiFi network can be independently accessed from the pAP to the SP network over a secure WPA2 pass-through from the UE to the SP network, in which the SP network operates a WAN that can further access the Internet, for example, and the home a network that access a network at the home to the SP network and to the Internet, for example.

Additionally, one or more SP network components can operate to partition or configure partitions as a partition configuration for NFV in a virtual access point (vAP) at the SP network from the pAP of the CPE. Various partitions can include different functionalities or VNFs that operate in the CPE and are virtualized to a point in the SP network so this point or vAP controls, manages and takes over these functions, as will be described in more detail below.

Figure 2:
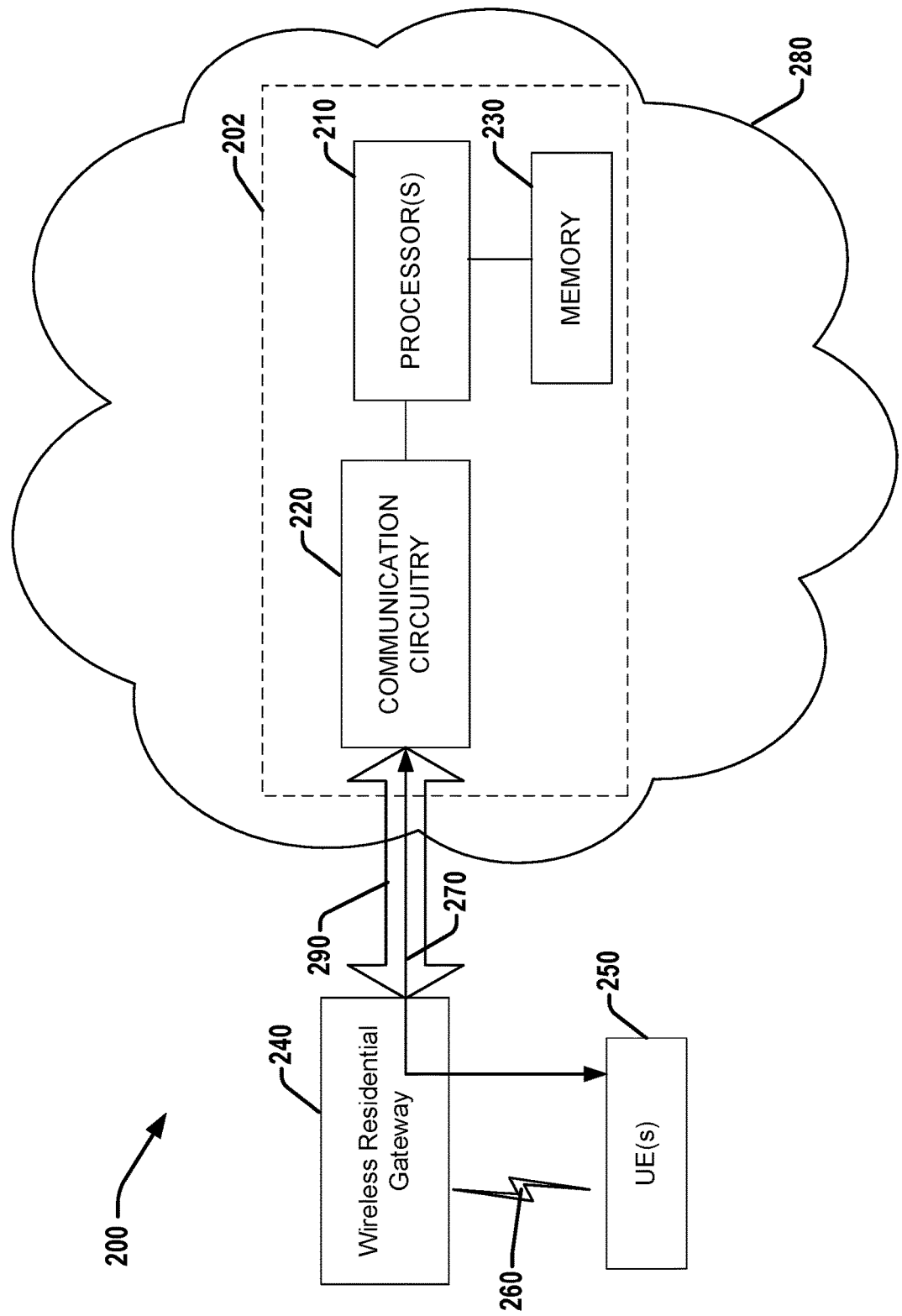
FIG. 2 is a block diagram illustrating components, according to some example embodiments, able to read instructions from a machine-readable or computer-readable medium (e.g., a machine-readable storage medium) and perform any one or more of the methodologies discussed herein.

Referring to FIG. 2, illustrated is a block diagram of a network system 200 or network environment with an SP network device 202 that can facilitate/enable generation, management, processing or termination of a WPA2 pass-through with a VNF based vAP of a community Wi-Fi network as a virtual WPA2, according to various aspects described herein. Depending on the embodiment, the SP network device 202 can be employed in connection with or comprise one or more of a network manager (NM), an element manager (EM), a virtual network function orchestrator (VNFO), a virtual network function manager (VNFM), a Virtualized Infrastructure Manager (VIM), a WiFi access point management (WAPM), a Radius Client, an authenticator, a Basic Service Set (BSS) management component, a Home Subscriber Server (HSS)/a Mobility Management Entity (MME)/a Serving GateWay (SGW)/a Packet Data Network (PDN) GateWay (PGW)/a Policy and Charging Rules Function (PCRF), which can be associated with a Third Generation Partnership Project (3GPP) standard, a WiFi Alliance standard, a European Telecommunication Standards Institute (ETSI) standard (such as NVF Management and Orchestration (MANO) standard), or other such standard, for example.

In one or more embodiments, the networks herein (e.g., network system 200) could operate in compliance with a 3GPP standard to provide a 3GPP management framework or with European Telecommunication Standards Institute (ETSI) standard such as NVF Management and Orchestration (MANO) standard to support lifecycle management to instantiate, terminate, scale in, scale out, scale up, or scale down one or more VNF instances dynamically according to demand, security or load balancing. As discussed herein, an "instance", instantiating or an instantiation can refer to starting (initiating) or executing (running) a virtual machine that is capable of implementing a VNF such as a VNF related to establishing (generating) or managing (controlling) a WPA2 pass-through of an SP network 280 that extends from an SP network device/component of the SP network to a UE (e.g., a mobile phone, laptop, personal computer, personal digital assistant, or other wireless device capable of connection to the SP network or the Internet). Termination can refer to closing or stopping the execution/ running such a virtual machine/component.

System 200 can comprise the SP network device/component 202 that can operate to instantiate or generate a WPA2 pass-through that virtualizes the security (e.g., authentication and security/privacy) of the wireless residential GW 240. The SP network device 202 can further enable an SP network that can provide WAN access (e.g., Internet access) to one or more subscribers/clients/client devices/UEs, for example. The SP network device 202 can include one or more processors 210 (e.g., processors 112, 114 or other examples herein), communication circuitry 220 (which can facilitate communication of data via/by/through one or more reference points, networks, APs, nodes, etc., and can comprise communication resource(s) 130, etc., of FIG. 1), and memory 230 (which can comprise any of a variety of storage mediums and can store instructions and/or data associated with at least one of the one or more processors 210 or communication circuitry 220, and can comprise memory/ storage device(s) and/or cache memory of processor(s) 210, etc.).

In some aspects, the one or more processors 210, the communication circuitry 220, and the memory 230 can be included in a single device, (e.g., the SP network device 202) being collocated or non-collocated, for example, while in other aspects, they can be included in different devices, such as part of a distributed network architecture/environment. As described in greater detail below, system 200 can enable the generation of a WPA2 pass-through 270 as an interface, tunnel or link between one or more UEs 250 and a vAP of an SP network component 202 of an SP network 280. The vAP, for example, can be an instantiated partition or proportion of resources located on the SP network 280 that is configured to perform one or more functions of the wireless residential GW/CPE 240 or a component thereof in lieu of or instead of the CPE 240.

The WPA2 pass-through 270, as generated by the SP network component 202, can virtualize the authentication or encryption that is associated with WPA2 security from the residential GW/CPE 240 to the SP network component 202, and further enable the WPA2 pass-through secure communications to one or more UEs through the residential GW 240 without modification of the associated data traffic by the wireless residential GW 240. Wi-Fi Protected Access (WPA) and Wi-Fi Protected Access II (WPA2) are two security protocols and security certification programs developed by the Wi-Fi Alliance to secure wireless computer networks. The Wi-Fi Alliance and standard body defined these in response to serious weaknesses researchers had found in the previous system, Wired Equivalent Privacy (WEP). WPA2 became available in 2004 and can be a shorthand for the full IEEE 802.11i (or IEEE 802.11i-2004) standard. WPA2 replaced WPA. WPA2, which demands testing and certification by the Wi-Fi Alliance, implements the mandatory elements of IEEE 802.11i. In particular, it includes mandatory support for Counter mode with cipher block chaining message authentication code (CBC-MAC) protocol (CCMP), an advanced encryption standard (AES)-based encryption mode with strong security.

A WPA2 pass-through can be an interface or connection through or via the CPE 240 from the SP network to a UE detected by the CPE 240 that is a secure connection/tunnel based on WPA2 security. The WPA2 pass-through can enable/manage an authentication or security protocol with the UE 250 based on a VNF of a physical access point (pAP) associated with the community WiFi network for a virtual access point (vAP) of the SP network 280 of the SP network device/component 202. An access point can be a Service Access Point (SAP), which can be an identifying label for network endpoints used in Open Systems Interconnection (OSI) networking. The SAP can be a conceptual/physical location at which one OSI layer can request the services of another OSI layer at different "endpoints". As an example, PD-SAP or PLME-SAP in IEEE 802.15.4 can be mentioned, where the Media Access Control (MAC) layer requests certain services from the Physical Layer. Service access points are also used in IEEE 802.2 Logical Link Control in Ethernet and similar Data Link Layer protocols, for example. When using the OSI Network Layer (connection-oriented network service (CONS) or connection-mode network service (CLNS)), the base for constructing an address for a network element can be a network service access point (NSAP) address, similar in concept to an IP address. OSI Application Layer protocols as well as Asynchronous Transfer Mode (ATM) can use Transport (TSAP), Session (SSAP) or Presentation (PSAP) Service Access Points to specify a destination address for a connection. These SAPs consist of NSAP addresses combined with optional transport, session and presentation selectors, which can differentiate at any of the three layers between multiple services at that layer provided by a network element.

A physical AP, or pAP can be established within a CPE, and be a part of the CPE/GW 240, for example. A VNF of a pAP associated with a community WiFi network can be a function that is associated normally with the physical AP (e.g., a physical SAP or physical location of an SAP/AP) and the community WiFi network (e.g., a hot spot network or passpoint), and further replaced or taken over in lieu thereof by another component; in one case, for example, this can be at the SP network 280 outside of the CPE 240 or home network environment, for example. For example, security, authentication or initiation of an instance of a WPA2 pass-through or a partition can be associated with the community WiFi network over other networks that could be generate simultaneously or concurrently through the CPE 240.

A partition can be referred to as a process that divides network functions by a partition configuration between the CPE 240 and the SP network component 202 of an SP network 280. A partition configuration of VNFs can be a division of functions between two components such as a pAP and a vAP, in which the vAP is associated with the functions of the pAP at a different location, such as on or a part of the SP network device/component 202 in the SP network 280. In one example, a server chip or processing device at a server or other network device of the SP network 280 can be comprise operations, instructions or software associated with the function that is replacing or being re-located from the pAP and the community WiFi network associated.

As such, the WPA2 pass-through can enable/manage an authentication or security protocol with the UE 250 based on a VNF of a pAP associated with the community WiFi network for (e.g., the creation of) a vAP of the SP network 280 of the SP network device/component 202. The vAP, thus, can be a creation or instance of a set of functions that have been virtualized from the pAP in relation to a community WiFi network. The community WiFi network can be a hot spot, or other pass point or network configured to be enabled at the CPE 240 for guest, subscribers of the SP (e.g., Com cast), or the home with a UE 250 that recognizes the community WiFi network by a BSSID, for example, and initiates connection with it. In return, an authentication/security protocol can be exchanged without interference, tampering, modification or concern of breach by or through the CPE 240.

The residential GW or CPE 240 in conjunction with the SP network system 200 can operate to support different types of authentication of wireless clients 250, or authentication standard protocols that can dictate how the client/UE 250 or mobile phone connects to the community WiFi network and how it authenticates to the SP network 280. For example, Wireless Internet Service Provider version 1.0, or WISPr 1.0, could be one such authentication protocol found in the airplane portal, or in public spaces when a public WiFi network without security could connect a UE 250 to the GW or CPE 240 according to one or more credentials (email, address, etc.) that could be similarly associated with an SP, for example, to further enable a WAN or Internet access based on browser-based login at a captive portal hotspot. Another example authentication protocol can be 802.1x or other IEEE standard 802.1, where a specific procedure/protocol with (e.g., 0.1x) can be with/without extensions such as EAP-TTLs, PEAP, EAP-SIM, EAP-AKA, for example, which are associated with different mechanisms that use different credentials/processes. Once access to a network such as the SP network 280 establishes connection to the internet or other network, for example, data traffic is encrypted (e.g., via WPA2) for security/privacy, or is left unencrypted. The WPA2 pass-through operates to provide such security as an end-to-end connection through a CPE 240 without modification by the CPE 240, as such the WPA2 pass-through can be said to be transparent to the CPE 240.

In one embodiment, the SP network component 202 can operate to virtualize authentication and encryption protocols over the WPA2 pass-through to ascertain one or more credentials to be filled in by the UE 250, or client by maintaining/controlling/operating functions that would otherwise be associated with the residential GW/CPE 240 at the SP network 280. The authentication protocols can include, for example, WISPr 1.0, or 802.1x protocol where a specific procedure/protocol with 0.1x can be with/without extensions such as EAP-TTLs, PEAP, EAP-SIM, EAP-AKA, for example.

As such, the SP network component 202, for example, can create a virtual network function for a pAP to form an instance of a vAP based on one or more VNFs, depending on the partition configuration. A home gateway—the wireless residential GW—can be connected to the SP network 280 over a cable/digital subscriber line (DSL)/passive optical network (PON) 290 with the data traffic or packets flowing through a GRE tunnel to the Wireless Access GW 240. The UE 250 is then connected over a WiFi link 260 to the residential GW 240. Privacy can be ensured via WPA 2 privacy on the wireless link 260 between the UE 250 and the residential GW device 240 or CPE. As such, the encryption key for such privacy would normally reside in the GW 240 (or in the AP) and in the UE devices 250. As such, all the data traffic or packets can be encrypted using WPA 2 or WISPr link, between the UE 250 and the GW 240. However, opportunities for spoofing from the home can still exist within the connection between the CPE 240 or pAP, for example, and the SP network, in which the cable, DSL, PON or other connection is existing (as traffic data can be in clear text). This can be especially true where the CPE 240 includes a range extender. From the CPE, data can then be further encrypted over the broadband link/cable DSL/PON L2 privacy on a communication link between the CPE 240 and the SP network 280 in the WLAN access GW network. As such, two links co-exist with different securities and in the middle there can be the opportunity for no security/privacy.

The WPA2 pass-through 270 from end-to-end ensures such security all the way through the CPE to the SP network and ensures that modification, tampering or breach of privacy does not provide opportunity otherwise, in association with a community WiFi network. The WPA2 pass-through 270 can be instantiated or generated by the SP network device 202 when there is a configuration at the CPE 240 where all the traffic for a specific network (e.g., community WiFi network) is passed transparently through the residential GW 240 without the residential GW 240 touching any of the bits on this traffic, and through the cable/DSL/PON access to the SP network 280 at one or more components/devices thereat (e.g. the SP network device 202).

Authentication or security protocol(s) can then be facilitated through the WPA2 pass-through 270 connection/interface. An encryption key is then communicated (shared) between the UE 250 and some function or component in the SP network 280 as part of such protocol. In this situation, all the data traffic from the connecting UE 250 can flow transparently through the home network CPE 240, gets to the SP network 280, and there it is encrypted/decrypted. With this approach utilizing or generating the WPA2 pass-through 270 by the SP network device/component, there is no security at home or at a home CPE, in the middle between the UE and the SP network, where the traffic is not encrypted and someone can hack into this home GW 240 and get an access to it. This is the traffic that does not belong to the home network, it's the traffic of the community WiFi, and thus belongs to the SP, but happens to pass through the home network via the WPA2 pass-through.

Figure 3:
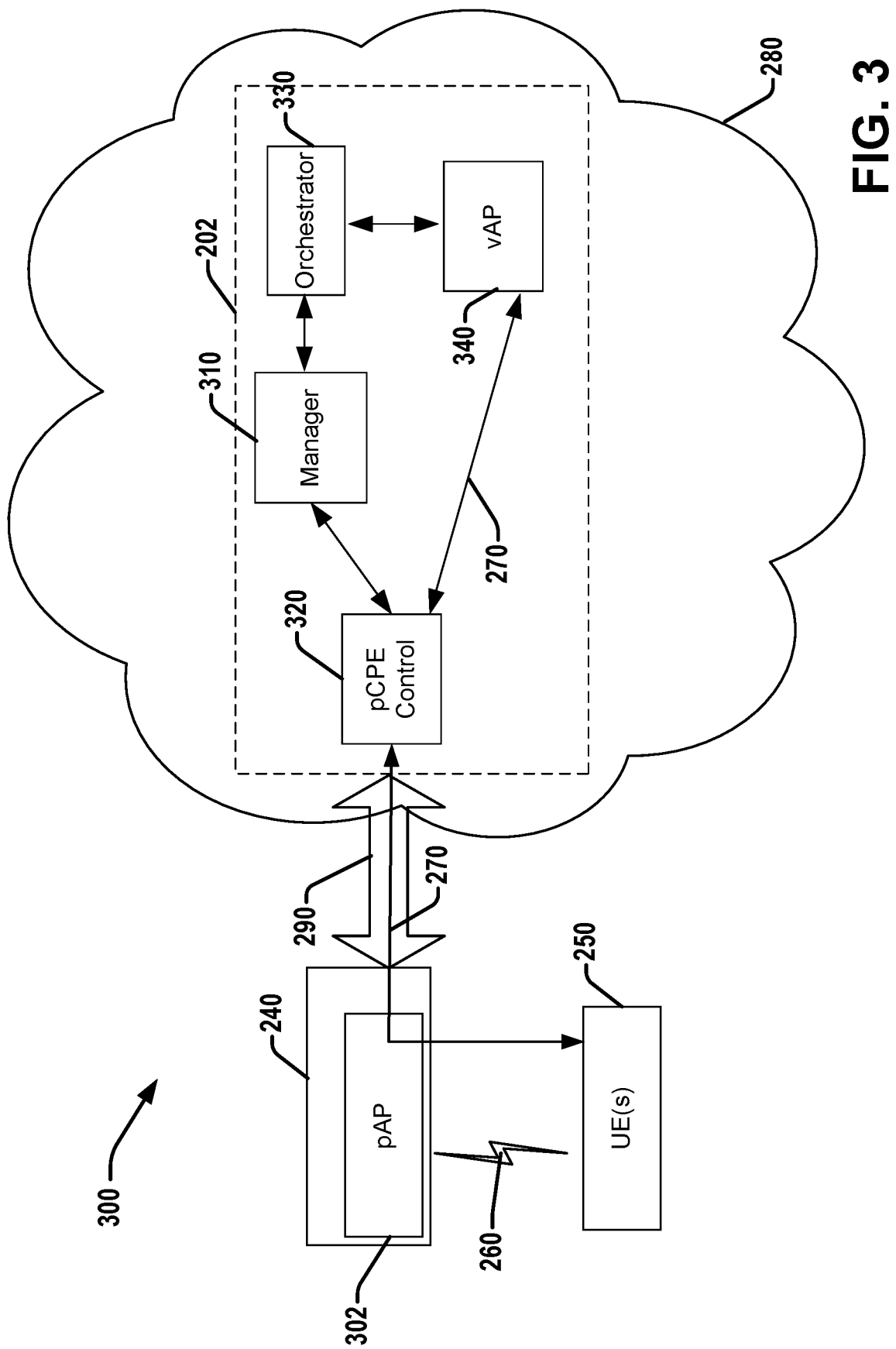
FIG. 3 is a block diagram of a network system that facilitates/enables operations in connection with a VNF related networking components and WPA2 pass-through operations, according to various aspects or embodiments described herein.

Referring now to FIG. 3, illustrated is another example of an SP network that can configure a WPA2 pass-through 270 in accordance with various aspects or embodiments described in this disclosure. In order to generate or instantiate the WPA2 pass-through 270 from the SP network 280 to the UE 250, the WiFi access point as a pAP 302 of the CPE 240 can be configured to operate in the WPA2 pass-through mode where the WPA2 pass-through 270 is functionally active for a virtual community WiFi access point or vAP 340 of the SP network 280. The pCPE control 320 can configure the CPE 240 to not interfere with data traffic associated particularly with a community Wi-Fi network and over or in conjunction with any home network or other LAN configuration the CPE 240 could also be configured to manage independently/separately alongside the community Wi-Fi network. In a WPA2 pass-through mode, for example, the CPE 240 simply passes data traffic associated with the community WiFi network along or through it on a WPA2 pass-through 270 communication interface, link or tunnel, for example.

In another embodiment, once the pAP 302 of the CPE 240 is configured to bypass any function associated with initializing a network (e.g., authentication, security encryption/decryption, etc.), a WiFi access port function including the functionality to derive one or more of these functions with an encryption key can be instantiated or moved from the pAP 302 to the SP network 280 to the vAP 340. The vAP 340 could operate all functions partitioned from the pAP 302 and to the vAP 340 as part of communication through an access GW controller or pCPE controller 320 at the SP network 280. The SP network 280 then can include therefore the access GW or pCPE control/controller 320, where, for example, the broadband from a home/residence/entity GW 240 can be connected. The connection from the pCPE control 320 to the CPE or residential GW 240, for example, could be over top of cable, DSL or PON, wireless or other connection 290 as a communication link or as part of the WPA2 pass-through 270.

Community WiFi Access GW or pCPE control 340 can be a component controls communication and flow of the BSS related to the community WiFi network and link VNFs with a corresponding instance of one or more vAPs 340, in which the data traffic for an associated BSS for community WiFi flows through. For example, the pCPE control/controller 320 could control the authentication protocol flow through the WPA2 pass-through 270 from the vAP 340 that initiates the flow per one or more request/inquiry/decryption operations, as well enable actions/operations related to virtualizing the functions, such as VNFs, from the pAP 302 to an instance of the vAP 340 associated with a community WiFi network. These devices or components can remain in the SP network.

In another embodiment, the manager component 310 and the orchestrator 330 can be a VNF orchestrator configured to enable virtualization of network functions from the CPE 240 based on a partition configuration of the VNFs. For example, the orchestrator 330 can be configured to facilitate/enable/control on-boarding of network services (NS) and VNF packages, NS lifecycle management, global resource management, validation and authorization of network functions virtualization infrastructure (NFVI) resource requests, and the like. The orchestrator 330 can be coupled to the manger 310 as well as the vAP (or virtualized network element) 340 as a VNF manager that oversees or controls lifecycle management of VNF instances; coordination and adaptation role for configuration and event reporting, for example. The pCPE can operate also as a virtualized infrastructure manager (VIM) as an entryway or portal to the SP network 280 and the SP network device(s) or components 202, for example, to control and manage the NFVI compute, storage, or network resources, including the WPA2 pass-through and WPA2 protocol process flows. Any one of the orchestrator 330, database or other server component (e.g., authentication, authorization, accounting server, or the like) of a server system, which manages or enables the SP network 280 can further operate to open an access for a specific user/UE 250 (e.g., service set identifier (SSID)) of the SP network 280 to the internet or other WAN.

A remote office or enterprise network such as with a VPN can be a configuration where a residential gateway is changed or configured to connect to the SP network 280 as an intranet of a business or other entity, such as to a corporate network or corporate IT system. The UE 250 (e.g., laptop, PC or other similar processing device) connects to the home and connects to the corporate network. However, disadvantages and potential security issues exists with the encryption, or the secured communication between the UE 250 laptop and the CPE or residential GW 240 in the home, which may use WPA2 security protocols between the UE and the CPE 240, or the UE 250 and a range extender connecting the UE 250 to the residential GW/CPE 240 as an end-to-end connection. In one solution, a second device from an enterprise company like Cisco, for example, (the AP or VPN client) can be provided with the VPN tunnel to connect with or at the CPE. Further, the VPN client additionally creates secured tunnel from the laptop to my corporate network. On top of this VPN link or tunnel, the UE 250 is able to communicate to be in corporate intranet and get access to any corporate services. However, the data traffic of the private network or home network at the CPE 240 is also put onto the VPN link. Essentially, access is provided to the VPN tunnel, which is from the home on the PC and usually adds to the processing frustration of the user experience, resulting in slower UEs often that are putting all home network activity on top of the VPN connection as well usually.

In an aspect, the WPA2 pass-through and virtualization of related functions can be enabled to replace virtual private network (VPN) functions of an enterprise network as the SP network 280, which can also comprise in this case an intranet or WLAN that can further be connected to other networks or the SP network 280 enabling access beyond to the internet or other WAN. The WPA2 pass-through in this case provides the enterprise security and can add to the 802.1x standard or related protocol connection.

For example, an authentication protocol can be 802.1x or other IEEE standard 802.1x, in which x is any integer or other undetermined variable, where a specific procedure/protocol with (e.g., 0.1x) can be with/without extensions such as EAP-TTLs, PEAP, EAP-SIM, EAP-AKA, for example, which are associated with different mechanisms that use different credentials/processes. Once access to a network such as the SP network 280 establishes connection to the internet or other network, for example, data traffic can be encrypted (e.g., via WPA2) for security/privacy, or is left unencrypted. The WPA2 pass-through operates to provide such security as an end-to-end connection through a CPE 240 without modification by the CPE 240, as such the WPA2 pass-through can be said to be transparent to the CPE 240. As such, the WPA2 pass-through creates a tunnel with transparent communication over the CPE 240 such that all the traffic between the UE 250 and the SP network 280 is unchanged and the end-points of the WPA2 pass-through can be fully secure end-points (e.g., layer 2 end-points) in the SP network 280 and in the UE 250.

In another embodiment, the community WiFi network can be a hot spot, or other pass point or network configured to be enabled by the SP network device/system 202 at the CPE 240 so that UEs 250 can that are not necessarily residents or secured for access by other networks managed by the CPE 240 (e.g., a home network or the like) can transparently access a community WiFi network via the WPA2 pass-through connection. A vAP 280 can be instantiated by removing functions of the pAP 302 from the CPE 240, or the home with a UE 250 that recognizes the community WiFi network. In response to a successful authentication from the authentication protocol with the SP network, the PS network device can receive, via the WPA2 pass-through 270, data traffic associated with a particular BSS corresponding to the community WiFi network enabled by the CPE 240 and be transparently passed along to the SP network for a virtual community WiFi network over the WPA2 pass-through as an end-to-end WPA2 connection between the UE 250 and SP network device 202 or one of the corresponding components thereat (e.g., the vAP 340). The BSS can identify or serve as a filter for UEs 250 not belonging or associated with the home network, which is managed by the CPE 240. The BSS of the community WiFi network can be from among multiple other BSSs for other networks managed by the home/residential CPE. However, the community WiFi network over the WPA2 pass-through is managed by the SP network 280 or associated SP network device/component thereof alone with associated VNFs, depending upon a VNF partition configuration, for example. The BSS of the community WiFi network can be one basic service set (BSS) from among a plurality of BSSs with a layer 2 privacy through a residential GW 240, wherein the BSS is based on a BSS identification (BSSID) associated with the community WiFi network. The UE 250 can then receive or initiate with a BSSID, for example, connection or access. In return, an authentication/security protocol can be exchanged without interference, tampering, modification or concern of breach via, by or through the CPE 240 over the WPA2 pass-through 270.

BSS, for example, can provide the basic building-block of an 802.11 wireless LAN. In infrastructure mode, a single access point (AP) together with all associated stations (STAs) can be called a BSS; not to be confused with the coverage of an access point, known as the basic service area (BSA). Every BSS has an id called the BSSID, which is the MAC address of the AP servicing the BSS.

The SP network 280 of the SP network device 202 with the home network of the CPE 240 can be a layer-to-layer network, in which there are multiple BSSs that can be configured in the wireless GW 240, one BSS for home network and another for the community WiFi network, for example. As such, the WPA2 pass-through associated with a community WiFi network can be established with only a specific BSS to bypass associated data traffic without modification. Thus, the majority of home/residential/entity data traffic belonging to the home CPE 240 can remain managed thereat, such as communication between a UE (e.g., a television, phone, etc.) to a phone, or media center to the TV, as well as further to the internet, for example. However, the community WiFi network via the WPA2 pass-through traffic always belongs to the SP network 280 or associated server/device/system of the SP network 280, and this home network of the CPE 240 just provides a means to get the bits from the mobile device to the SP for an end-to-end pass-through interface, namely the WPA2 pass-through itself.

In another aspect/embodiment, there can also be multiple virtual APs 340 that can be defined over a single WiFi access point chip or processing device (e.g., processors 112, 114, or 210), such as the pAP 302. For example the CPE 240 can define multiple APs through the one pAP, one for home and one for community WiFi. The UE 250, for example, could see/detect multiple WiFi networks, all of which can be enabled/configured in the same piece of hardware or CPE 240. The SP network device 202 of the SP network operates to virtualize one (e.g., the community WiFi network) by taking physical functions and removing them from the pAP 302 to the vAP 340 of SP network 280 as VNFs and leaves the home network with another BSS or BSSID untouched or remaining as configured already at the pAP 302, for example, for a virtualized community WiFi network to be created.

As such, multiple different virtual APs can be defined over a single WiFi access point (e.g., the pAP 302 of the CPE 240). A home AP or home network can operate in conjunction at the CPE, and over single WiFi AP, processing device or CPE, for example, multiple APs (e.g., pAP 302), one for a home network that manages UEs at a residence or entity, and another one for a community WiFi network. The UE 250, thus, would detect or observe the different WiFi networks available the same piece of hardware. However, the SP network device/component 202 could virtualize just the communication WiFi network at the vAP 340, and maintain the others with function at the CPE 240. As such, the home network could still control home traffic for traffic to the general internet as determined in the home at the CPE 240, which is not related to the SP, while control of removing such functions for access from the CPE 240 and to the SP network for the community WiFi network can be done by the network pAP controller 320 and to instantiate the vAP 340.

In one example, two or more virtual APs 340 can be generated with a distinct network names and a MAC address. Additionally, two or more community WiFi networks virtual APs with a distinct network name and MAC address can also be formed/instantiated. As such, multiple virtual APs can be enabled over a single WiFi AP GW/CPE 240 to provide multiples VLANs supported by one or more processors, for example, to provide, for example, 4 to 64 different vAPs 340. One or more virtual APs can have a distinct L2 MAC address (e.g., a BSSID), a distinct network name (e.g., SSID) and maintain a separate protocol identify, for example. From the UE 250's perspective, the virtual APs would appear as several APs that operate on the same radio frequency (RF) channel. WiFi AP firmware and software layers can be designed for common functions (e.g., channel selection, channel access, or the like) and per-virtual AP functions (e.g., data traffic segregation, L2 security or the like).

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 4:
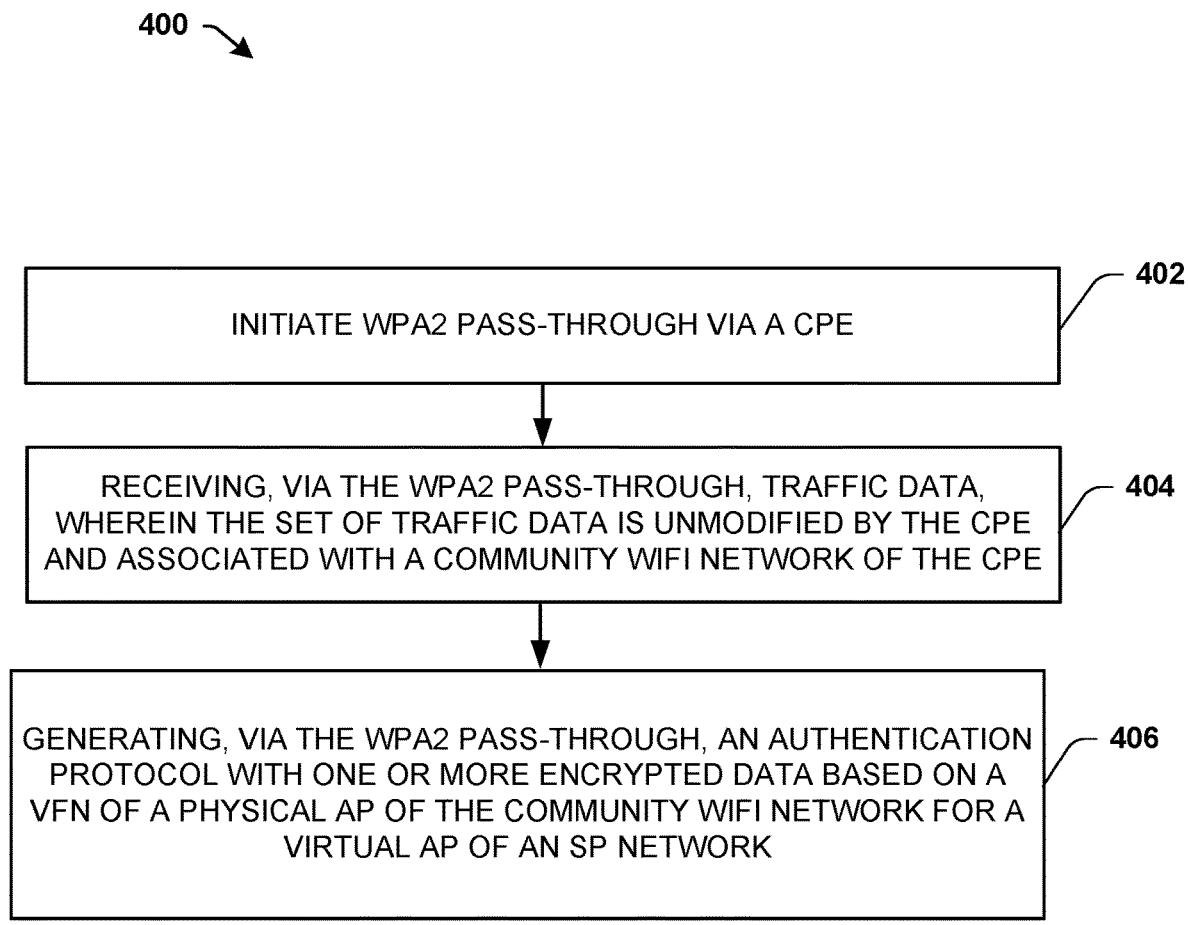
FIG. 4 a block diagram of a process flow for a SP network WPA2 pass-through according to various aspects described.

Referring to FIG. 4, illustrated is a process flow 400 employed within a system or device for enabling a WPA2 pass-through from an SP network. An SP network component can execute one or more operations by a processing device with a memory having executable instructions.

At 402, the operations can include initiating a WiFi protected access 2 (WPA2) pass-through via a CPE 240 to a UE 250. The WPA pass-through 270 can be an end-to-end connection between the UE 250 and a component (e.g., vAP 340) of the SP network 280. The WPA2 pass-through 270 can be a link, tunnel or interface that is secured by a WPA2 security and further passes-through the physical components of a residential GW or CPE 240 to the UE 250 and to the vAP 340, for example, or other SP network component (e.g., pCPE control 320, manager 310, orchestrator 330 or other components of the SP network 280.

At 404, the process flow 400 includes receiving, via the WPA2 pass-through, a set of traffic data from the UE, wherein the set of traffic data is unmodified by the CPE and associated with a community WiFi network of the CPE. The UE 250 can detect a community WiFi network over a residential gateway or CPE 240. The UE 250 can then further initiate the WPA2 pass-through generation via a pAP 302 of the CPE 240 by connecting with the community WiFi network associated with an SP network at the vAP 340. The UE can then communicate transparently via the WPA2 pass-through a set of encrypted data to enable an authentication protocol at the vAP, in which the data is unmodified and decrypted at the vAP where it is received.

At 406, the SP network device can then receive data from the UE over the WPA2 pass-through and be configured to generate, by the wpa2 pass-through, an authentication protocol with encrypted data based on a VNF of the pAP associated with the community WiFi network for a vAP of the SP network. In other words, the vAP can become generated by a NVF of the pAP to the SP network by a virtualization of its functions that replaces them on the SP network.

The SP network device can comprise a WiFi access point management (WAPM)/a Radius Client/an authenticator/a BSS management, for example, that receives UE data over the WPA2 pass-through that is associated with one BSS form among different BSSs with Layer 2 privacy configured at the CPE. The BSS can be associated with the community WiFi network based on a BSS identification (BSSID) at a pAP, which passes any UE data traffic related through the WPA2 pass-through without modification, or transparently.

Figure 5:
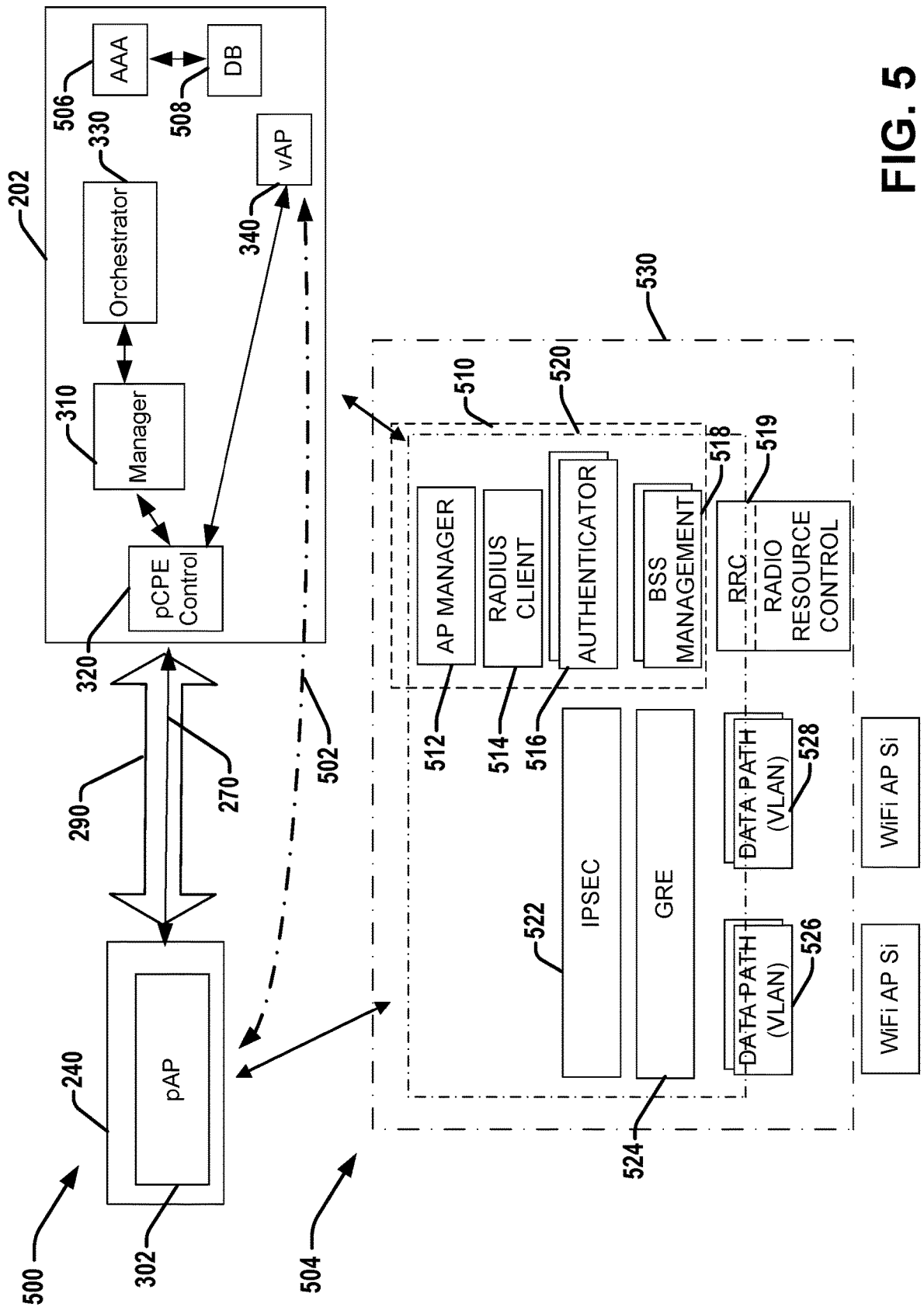
FIG. 5 is another network system that facilitates/enables operations in connection with a VNF related networking components and WPA2 pass-through operations for dynamic partition configuration, according to various aspects or embodiments described herein.

Referring to FIG. 5, illustrated are different partition configurations for virtualizing or generating VNFs from the residential GW to the SP network associated with a community WiFi network system 500 for enabling/supporting a WPA2 pass-through. Reference is also made to the above figures in the description. A partition configuration can refer to the resources, hardware, firmware or software and associated functions that are either removed from the pAP 302 and assigned to the vAP 340, or kept at the pAP 302 in the CPE 240, for example. Each feature or function associated with the community WiFi network at the CPE 240 can be enabled by a change in the partition (or partition configuration), which defines which functions are at the pAP 302 or removed/assigned for operation to the vAP 340. Some of the functions of the CPE 240 can be moved out and put in a data center, server component, or other SP network device/component 202, which further can change the protocol, how the different functions communicate in and out from one another through the WPA2 pass-through.

In one embodiment, a communication link 502 can be provided between the CPE and the vAP 340, which can be controlled by the orchestrator 330, for example, in order to control and measure communication parameters there-between. One such communication parameter, for example, can include a communication latency. Other communication parameters can also be monitored by the orchestrator 330 as well, such as power, signal strength, load, or other communication network parameters in order to dynamically determine the partition configuration of the APs for VNFs associated with the WPA2 pass-through.

The orchestrator 330 can operate in conjunction with the vAP 340 or the control 320 of the SP network in order to generate or configure partition configurations of the VNFs dynamically or on-the-fly based on a communication parameters (e.g., latency) of the communication link 502. The partition configurations 504 can be virtualized (moved from the CPE 240 to the SP network device 202) to the vAP 340 so that any one partition 510-530 can be selected, enabled or dynamically modified from among these functions, which can be removed from the CPE 240 and executed/assigned by the SP network at the vAP 340 or other SP network component, for example, in relation to a community WiFi network.

The orchestrator 330, for example, can measure latency, and then decide by the latency which functions to virtualize or re-assigned from the pAP 302 to the vAP 340. Based on this decision, the orchestrator 330 configures (both the virtual network function(s) VNFs 504 and the physical AP 302 to instantiate this specific configuration (or partition configuration). Different configurations can be enabled based on latency. For example, partition configuration one 510 can be enabled as a first a partition configuration from among different VNFs when the latency of the link 502 (or 290) is within a first range (e.g., about 100 ms or greater than 100 ms). A second partition can be configured when the latency is determined as being within a second range that is different from the first. The second range can comprise, for example, a latency value that is less than about 100 ms and greater than about 10 ms. A third partition configuration that is different from the first and second partitions can be configured when the latency is in a third range different from the first and second ranges. For example, the third range can be a latency value that is less than about 10 ms.

In another embodiment, the first partition 510 can include the following components along with associated functions or VNFs as they can be referred to herein. For example, a WiFi AP management component 512 can be configured to operate one or more policy settings associated with the vAP 340, such as security policies, security extensions with WPA2 security, group settings of one or more UEs, permissions, relates quality of service parameters (QoS), or other network policies or settings, for example. The first partition 510 can further include a RADIUS client component 514 that is configured to operate one or more authentication processes with an authentication server component 506, such as an authentication, authorization, accounting server as well as an associated database 508, for example. The AAA server component 506 can operate to retrieve/compare/confirm/process one or more keys, or security credentials for authentication or decryption of data traffic, for example. The first partition 510 can further include an authenticator component 516 configured to authenticate a user equipment (UE) with the vAP 340 through the pAP 302 on the WPA2 pass-through 270 based on the one or more authentication processes/protocols. The first partition 510 can further include a basic service set (BSS) management component 518 configured to operate a channel selection associated with a BSS identification (BSSID) of the community WiFi network for a client authentication and a key derivation, for example. The BSS management component 518 can control L2 security (per SSID/BSSID), as well as client connection management, the RADIUS CLIENT, or robust security client/WPA2 authentication/authentication requests. Any one of these components/associated functions by which each is configured can reside within or be controlled by the SP network device 202 or any component (e.g., virtual AP 340) therein, for example, as VNFs associated with the SP network 280 from the pAP 302.

In another embodiment, the first partition configuration of VNFs, including the AP management component 512, the RADIUS client component 514, the authenticator 516, and the BSS management component 518 can be classified as non-real time functions, in which the functions do not necessarily occur immediately in time and even if the function is not successful/complete or fails to meet a parameter or time deadline, possibly more than one (e.g., with multiple requests), the network system 500 is not considered in failure. As such, in some instances the results are not worthless in value for a result after any deadline for requests of the associated function, or is not zero, rather it could degrade over time or be pre-configured without being modified immediately or dynamically upon any modification or change in parameters or partition configuration, for example. These functions (VNFs) can be considered non-real time function with a latency of greater than about 10 ms, for example.

Additionally, the second partition 520 can further include a radio resource control (RRC) component 519 configured to control per client (UE) functionalities and common functions among clients. The per client functionalities can include at least one of: setting a data path, transmit parameters (e.g., transmit power), one or more modulation coding schemes, a channel width, one or more beamforming groups, or client/UE received signal strength indicators, and the like. Common client functionalities can include at least one of: a dynamic frequency selection, a channel load or coexistence. Additionally, the second partition 520 can include an IPSec channeling/tunneling component 522 operations, GRE component 524 operations, as well as data path functions 526 and 528. These functions and components of the second partition configuration 520 can be based on a real-time operation (RRC 519, IPSec 522, GRE 524, data path 526, 528) and a non-real time operation (e.g., the components and related functions of the first partition configuration 510). Real-time operations can includes those functions that have a latency (e.g., a round trip packet latency or time for the function to operate) or take between one to ten milliseconds to function, and non-real time functions can be those that have a latency of greater than 10 milliseconds, for example.

The third partition configuration 530 can include components/functions within the first partition configuration 510 and the second partition configuration 520, including related components and functions (or potential VNFs) that operate or demand hard real time operation. For example, the RRC 519 can include partially real-time and partially hard real time functions, in which the hard real time functions can be those functions of an associated component that are performed or utilized resources for any associated function for less than about 1 ms. A hard real time function can require a particular deadline, otherwise failure of the function can occur if success is not achieved on the first endeavor, for example.

The first partition configuration 510 of VNFs, including the AP management component 512, the RADIUS client component 514, the authenticator 516, and the BSS management component 518 can be classified as non-real time functions, in which the functions do not necessarily occur immediately in time and even if the function is not successful/complete or fails to meet a parameter or time deadline, possibly more than one (e.g., with multiple requests), the network system 500 is not considered in failure. As such, in some instances the results are not worthless in value for a result after any deadline for requests of the associated function, or is not zero, rather it could degrade over time or be pre-configured without being modified immediately or dynamically upon any modification or change in parameters or partition configuration, for example. These functions can be considered non-real time function comprising a latency of greater than about 10 ms, for example. The second partition configuration 520 further comprises real-time functions and associated components (RRC 519, IPSec 522, GRE 524, data path 526, 528), in which even if the component or function of the component fails to meet the deadline/time frame, possibly more than once (i.e. for multiple requests), the system is not considered to have failed. The real time functions operate with a latency of between about 1 to 10 ms, for example, while the third partition configuration includes hard real time functions operational at a latency of less than 1 ms.

In another embodiment, a configuration can be based on the type of interface between the CPE 240 and the SP network 280. For example, a cable network access can be selected to operate with the second partition configuration 520, while DSL or PON can differ in partition configuration in order to further enable/support/manage the WPA2 pass-through. The partition configurations however can be modified at any time during communication packet transfer between the UE, through the CPE and to the SP network based on the latency detected. Other parameters can instantiate other partition configurations as well, and the disclosure is not limited to latency as the only parameter(s) that can be used for dynamically enabling/generating a partition configuration from among various different potential partition configurations with or based on one or more VNFs. Further, the first, second, and third partitions 510-530 can be selected with different functions described herein as VNFs in different partitions 510530. However, these example partition configurations 510-530 are not fixed or static to the given example embodiments described herein for supporting the WPA2 pass-through.

The data path components 526 and 528 can include functionality that at least partially can be moved out, or virtualized from the CPE 240 to the SP network 280 or device 202 as VNFs as well. The data paths or planes 526, 528 can be demonstrated as multiple network interfaces (interfaces per VLAN). Essentially, the network that is particularly being virtualized (i.e., the community WiFi network from the home CPE 240 with one or more related VNFs). One interface can be for the home network that is not virtualized, and the other one can be for the network that is virtualized. The functions managed by each here can include WPA2 privacy WPA2 privacy (e.g., encryption/decryption of the packet). For the non-virtualized network the privacy encryption/decryption can stay here in the data path locally at the CPE 240, but the other one, for example, can be virtualized to the SP network where the encryption/decryption can be moved out to the SP network as well.

These partition configurations, for example, 510-530 demonstrate what VNFs can stay at the home and what can move out. Thus, each partition configuration with associated components or functions of the components can be virtualized and moved to the SP network 280, the SP network device 202, or an associated component in operation or functional capacity. Essentially, in order for the orchestrator 330 to decide what to move, the latency of the communication (e.g., over link 502 or 290) between the pAP 302 and the SP network is determined. In particular, because if the latency is too large, and some of the protocols/functionality is virtualized or moved out, the protocol itself built on wireless WiFi protocol will fail because it is bound in time.

In another embodiment, in order to define/determine what the latency of the communication is, the latency or link is measured. The orchestrator 330 can measure the latency by using a "ping" procedure. A ping, communication or query can be sent from the SP network 280 to the AP 302, which replies to the PING in response, and then the orchestrator 330 can measure the time it takes to receive the response, which will determine the latency. Then, the SP orchestrator 330 or manager 310 can operate to decide how to configure the partitions as well as the appropriate ranges of any parameters associated with the particular partition configurations 510-530, for example. Then the SP orchestrator 330 can configure the partition configuration 510-530 option with the AP 302 by sending a command to the AP 302 that indicates the partition configuration by which it should function or operate in association with a community WiFi network and one or more connecting UEs thereto. In addition, the orchestrator 330 can configure the appropriate VNFs on the SP network side of the WPA2 pass-through 270.

Figure 6:
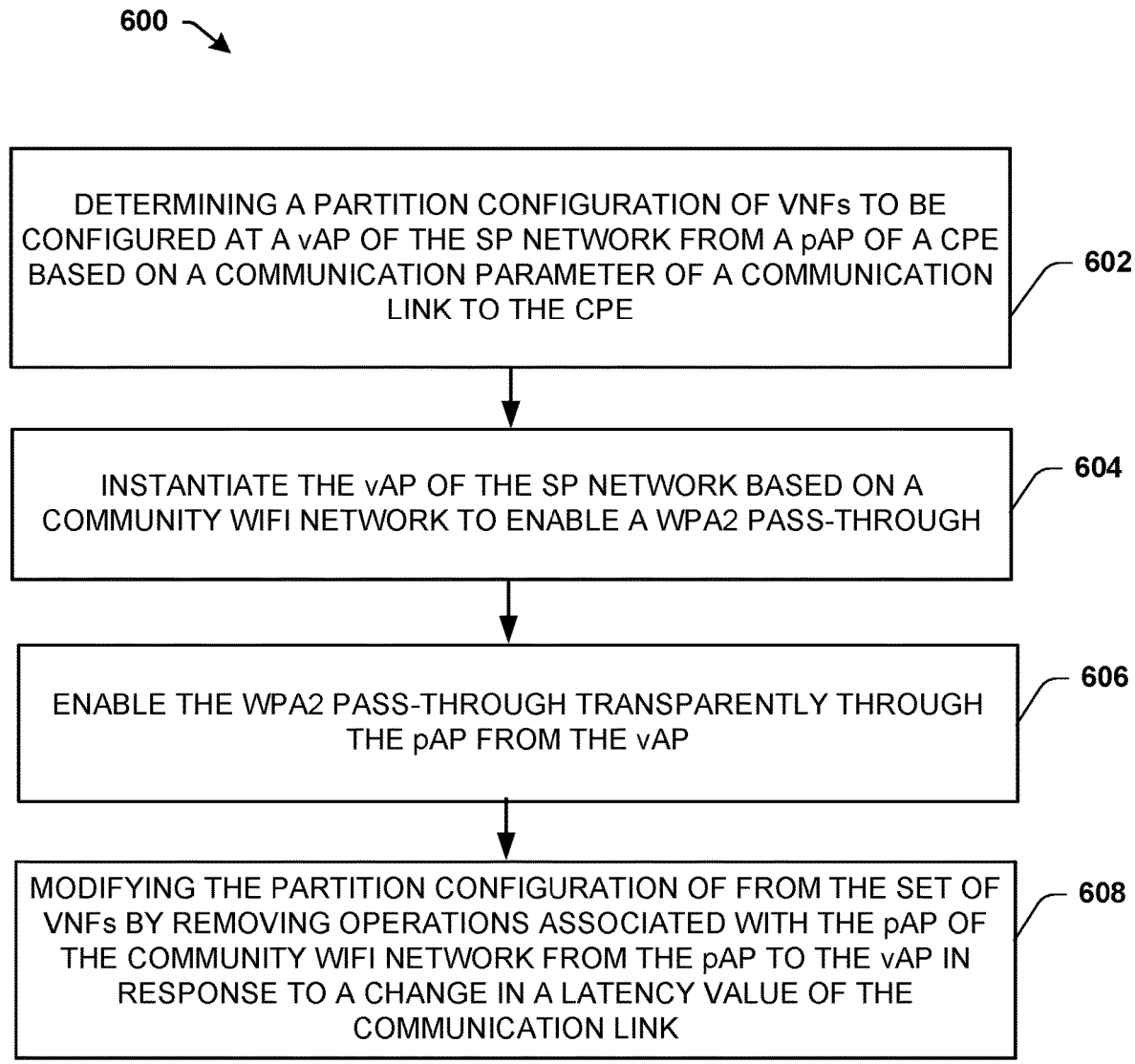
FIG. 6 another block diagram of a process flow for a SP network WPA2 pass-through and associated partition configurations according to various aspects described.

Referring to FIG. 6, illustrated is an example process flow 600 for dynamic partitioning operations associated with FIG. 5 in accordance with the aspects or embodiments being disclosed.

At 602, the process flow 600 initiates with determining a partition configuration of one or more VNFs to be configured at a virtual access point (e.g., vAP 340) of the SP network 280 from a physical access point (e.g., pAP 302) of a customer premise equipment (e.g., CPE 240) based on a communication parameter of a communication interface/link (e.g., link 502) to the CPE 240.

At 604, the flow comprises instantiating the vAP of the SP network based on a community WiFi network to enable a WiFi protected access 2 (WPA2) pass-through. This act can be based on the a partition configuration determined by the VNF orchestrator 330, for example. A communication query or PING can be sent to the CPE, a response then received in response to the PING/query, and based on a measurement of a related parameter (e.g., WAN latency, load, etc.) the partition can be selected and configured.

At 606, the flow continues by enabling the WPA2 pass-through transparently through the pAP from the vAP.

At 608, the orchestrator 330, for example, can modify the partition configuration of from the set of VNFs by removing operations associated with the pAP of the community WiFi network from the pAP to the vAP in response to a change in a latency value of the communication link.

The first partition configuration from the set of VNFs can be configured when a link latency is about 100 ms or greater. The second partition configuration from the set of VNFs can be configured when the link latency is less than about 100 ms and greater than about 10 ms. A third partition configuration can be configured from the set of VNFs when the link latency is about 10 ms, or less than about 10 ms, for example. Alternatively, other ranges of parameters can correspond differently to the first, second or third partitions.

As such, the orchestrator component 330, or the SP network device 202 can measure a WAN link latency: GW-to-SP network Access GW, using a PING of communication, for example. Then a decision can be made to enable vAP functions based on measured latency, such as for non-real time control only (e.g., the first partition 510), non-real time control with privacy and a part of real-time control (e.g., the second partition 520), non-real time, real time, hard real-time control, and privacy (e.g., the third partition 530). Then the orchestrator 330 can configure the GW functions and AP VNFs (e.g. as a vWPA2 pass-through operational system). Then AP management and control is located on the virtual WPA control VNF, the AP data plane is in the virtual plane.

Figure 7:
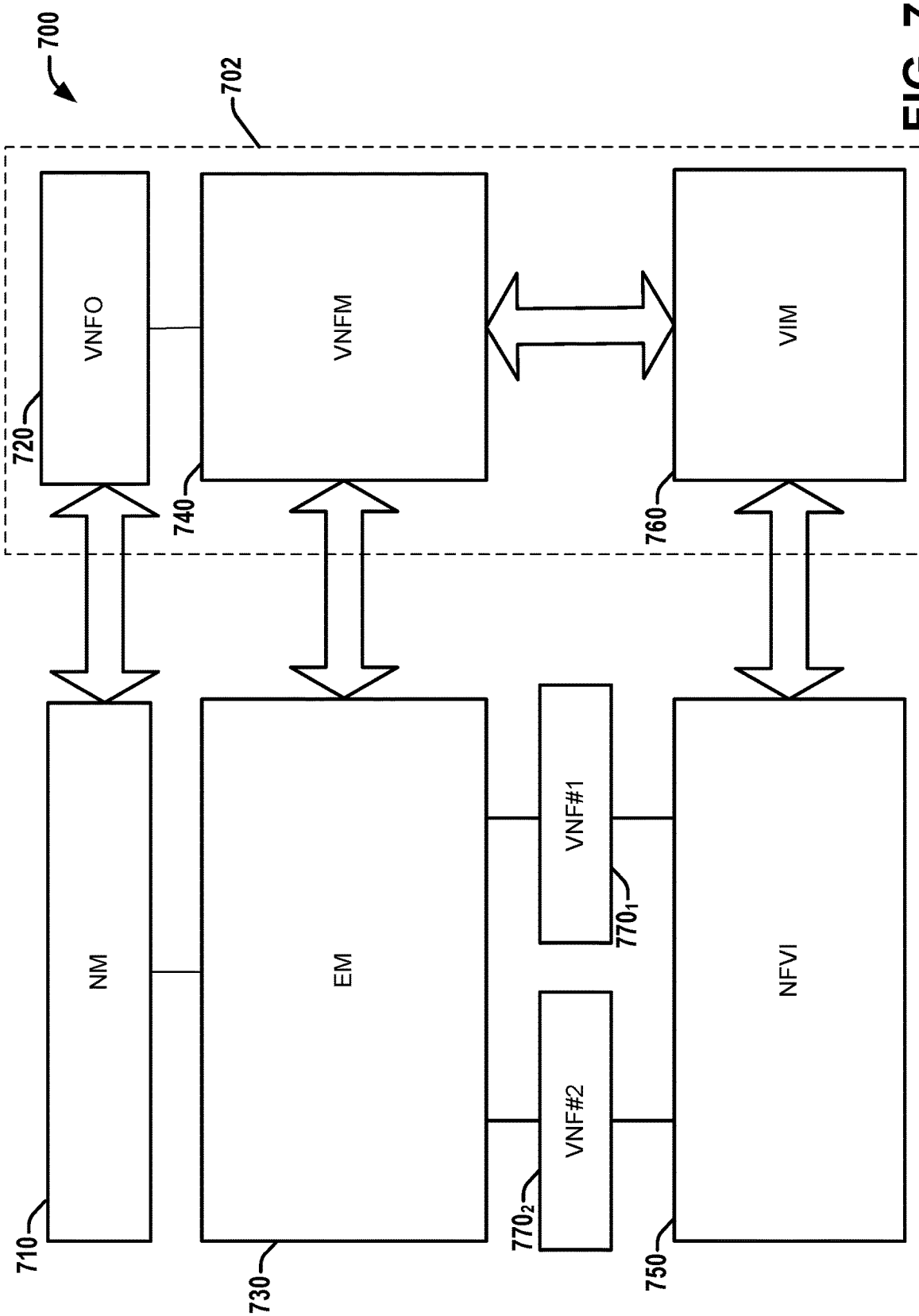
FIG. 7 is another network system that facilitates/enables operations in connection with a VNF related networking components and WPA2 pass-through operations for dynamic partition configuration, according to various aspects or embodiments described herein.

Referring now to FIG. 7, illustrated is an example virtualization architecture in accordance with various aspects or embodiments herein. For example, the NFV operations can be performed/managed according to the SP components, which can correspond to similarly to an NFV management and organization (NFV MANO) 702, as a defined framework for the management and orchestration of the cloud data center, including computing, networking, storage, and virtual machine (VM) resources. One or more components or devices within or a part of the SP network 280. The architecture 700 can facilitate or enable VR performance measurement threshold monitoring (e.g., such as by one or more partition configuration/communication link parameters) as well as threshold crossing notification according to various aspects described herein. In FIG. 7, a virtual network function (VNF) performance measurement (PM) threshold creation flow (and optional subsequent notification of threshold crossing) that can be employed in connection with various aspects described is illustrated as an example threshold monitoring operation, along with a threshold crossing notification flow.

The system illustrated in FIG. 7 comprises a Network Manager (NM) 710, Network Function Virtualization (NFV) Orchestrator (NFVO) 720, network Element Manager (EM) 730, a set of Virtualized Network Functions (VNFs) 770; virtualized by Virtualization Resources (VRs) of a NFV Infrastructure (NFVI) 750, a VNF Manager (VNFM) 740, and a Virtualized Infrastructure Manager (VIM) 760. The solid lines between these entities indicate the various reference points that facilitate data exchange between these entities, the dashed lines indicates the flow of data associated with threshold creation, and the dashed and dotted lines indicate the flow of data associated with the notification of threshold crossing.

One or more components discloses or described herein can correspond to these components. For example, the orchestrator 330 can be configured as the VNFO 720 to facilitate/enable/control on-boarding of network services (NS) and VNF functions, VNF packages, NS lifecycle management, global resource management, validation and authorization of network functions virtualization infrastructure (NFVI) resource requests, and the like. The orchestrator 330 can be coupled to the manger 310 as well as the vAP (or virtualized network element) 340 as a VNF manager 740 that oversees or controls lifecycle management of VNF instances; coordination and adaptation role for configuration and event reporting, for example. The pCPE control 320, for example, can operate also as a virtualized infrastructure manager (VIM) 760 as an entryway or portal to the SP network 280 and the SP network device(s) or components 202, for example, to control and manage the NFVI compute, storage, or network resources, including the WPA2 pass-through and WPA2 protocol process flows. Any one of the orchestrator 330, database or other server component (e.g., authentication, authorization, accounting server, or the like) of a server system, which manages or enables the SP network 280 can further operate to open an access for a specific user/UE 250 (e.g., service set identifier (SSID)) of the SP network 280 to the internet or other WAN.

Figure 8:
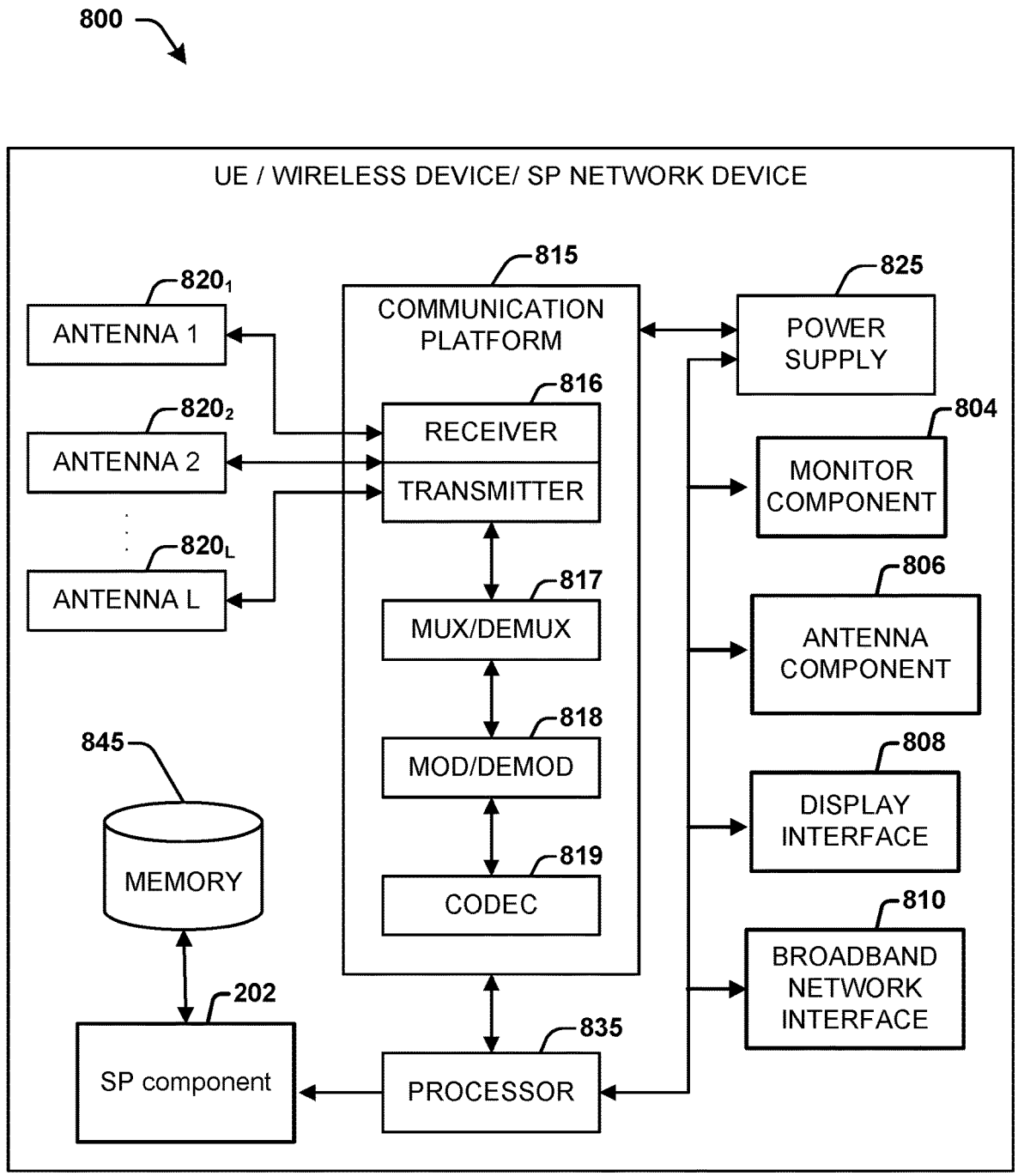
FIG. 8 is an example network device, either as UE or SP network device in accordance with aspects or embodiments herein.

In order to provide further context for various aspects of the disclosed subject matter, FIG. 8 illustrates a non-limiting example of a UE device, such as a laptop, tablet, or other communication device or wireless terminal 800 that can implement some or all of the aspects described herein. In an aspect, wireless terminal, such as a laptop, tablet, other communication device, or wireless terminal, network device or SP network device 800 of an SP network can receive and transmit signal(s) to and/or from wireless devices such as APs, access terminals, wireless ports and routers, or the like, through a set of L antennas 820$1_1$_, which can be configured according to one or more embodiments or aspects described herein. In one example, antennas 820 can be implemented as part of a communication platform 815, which in turn can comprise electronic components and associated circuitry and/or other means that provide for processing and manipulation of received signal(s) and signal(s) to be transmitted. The antennas 820 can comprise the various antenna elements incorporating the different aspects or embodiments disclosed herein.

In an aspect, communication platform 815 can include a monitor component 804 and antenna component 806, which can couple to communication platform 815 and include electronic components with associated circuitry that provide for processing and manipulation of received signal(s) and other signal(s) to be transmitted. The communication platform 815 can further comprise a receiver/transmitter or transceiver 816, which can transmit and receive signals and/or perform one or more processing operations on such signals (e.g., conversion from analog to digital upon reception, conversion from digital to analog upon transmission, etc.). In addition, transceiver 816 can divide a single data stream into multiple, parallel data streams, or perform the reciprocal operation.

Additionally, the communication device 800 can include display interface 808, which can display functions that control functionality of the device 800, or reveal operation conditions thereof. In addition, display interface 808 can include a screen to convey information to an end user. In an aspect, display interface 808 can be a liquid crystal display, a plasma panel, a monolithic thin-film based electro chromic display, and so on. Moreover, display interface 808 can include a component (e.g., speaker) that facilitates communication of aural indicia, which can also be employed in connection with messages that convey operational instructions to an end user. Display interface 808 can also facilitate data entry (e.g., through a linked keypad or through touch gestures), which can cause access equipment and/or software 800 to receive external commands (e.g., restart operation).

Broadband network interface 810 facilitates connection of access equipment and/or software 800 to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 810 can be internal or external to access equipment and/or software 800, and can utilize display interface 808 for end-user interaction and status information delivery.

Processor 835 can be functionally connected to communication platform 808 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 835 can be functionally connected, through data, system, or an address bus, to display interface 808 and broadband network interface 810, to confer, at least in part, functionality to each of such components.

In another example, a multiplexer/demultiplexer (mux/demux) unit 817 can be coupled to transceiver 816. Mux/demux unit 817 can, for example, facilitate manipulation of signal in time and frequency space. Additionally or alternatively, mux/demux unit 817 can multiplex information (e.g., data/traffic, control/signaling, etc.) according to various multiplexing schemes such as time division multiplexing (TDM), frequency division multiplexing (FDM), orthogonal frequency division multiplexing (OFDM), code division multiplexing (CDM), space division multiplexing (SDM), or the like. In addition, mux/demux unit 817 can scramble and spread information according to substantially any code generally known in the art, such as Hadamard-Walsh codes, Baker codes, Kasami codes, polyphase codes, and so on.

In a further example, a modulator/demodulator (mod/demod) unit 818 implemented within communication platform 815 can modulate information according to multiple modulation techniques, such as frequency modulation, amplitude modulation (e.g., L-ary quadrature amplitude modulation (L-QAM), etc.), phase-shift keying (PSK), and the like. Further, communication platform 815 can also include a coder/decoder (codec) module 819 that facilitates decoding received signal(s) and/or coding signal(s) to convey.

According to another aspect, wireless terminal 800 can include a processor 835 configured to confer functionality, at least in part, to substantially any electronic component utilized by wireless terminal 800. As further shown in system 800, a power supply 825 can attach to a power grid and include one or more transformers to achieve a power level at which various components and/or circuitry associated with wireless terminal 800 can operate. In one example, power supply 825 can include a rechargeable power mechanism to facilitate continued operation of wireless terminal 800 in the event that wireless terminal 800 is disconnected from the power grid, the power grid is not operating, etc.

In a further aspect, processor 835 can be functionally connected to communication platform 815 and can facilitate various operations on data (e.g., symbols, bits, chips, etc.), which can include, but are not limited to, effecting direct and inverse fast Fourier transforms, selection of modulation rates, selection of data packet formats, inter-packet times, etc. In another example, processor 835 can be functionally connected, via a data or system bus (e.g., a wireless PCIE or the like), to any other components or circuitry not shown in system 800 to at least partially confer functionality to each of such components, such as by the antenna systems disclosed herein.

As additionally illustrated, a memory 845 can be used by wireless terminal 800 to store data structures, code instructions and program modules, system or device information, code sequences for scrambling, spreading and pilot transmission, location intelligence storage, determined delay offset(s), over-the-air propagation models, and so on. Processor 835 can be coupled to the memory 845 in order to store and retrieve information necessary to operate and/or confer functionality to communication platform 815 and/or any other components of wireless terminal 800.

Further, the antenna systems described above with the communication device 800 can also be configured, for example, to operate at a wide range of frequencies in a high band frequency range additionally include peer-to-peer (e.g., mobile-to-mobile) ad hoc network systems often using unpaired unlicensed spectrums, 802.xx wireless LAN, BLUETOOTH and any other short- or long-range, wireless frequency ranges and communication techniques. The narrow band antenna elements disclosed herein, such as antennas resonating systems of devices disclosed, for example, can also be configured to operate at other frequency ranges also.

In other examples, the components (of SP device 202 or an affiliated component) disclosed herein can operate to communicate wirelessly with other components, such as the display interface 808 as a wireless device, or with other wireless interfaces, such as a wireless USB device, for example. For example, a wireless USB device can communicate within a frequency range. In addition, the antenna systems disclosed can be configured to communicate with other wireless connections, components, interfaces or devices in order to provide communication interfacing for wireless component-to-component communications. For example, a PCB to PCB interface can be facilitated by the high band antenna systems as well as micro millimeter wave communications among one or more internal or external components. Other communication interfaces can also be facilitated by the antenna elements disclosed such as an internet of things (IoT) to IoT components, wearable components, mobile to mobile, a network base station (e.g., a macro cell network device, femto cell device, pico cell device or other network devices) or any combination thereof to communicate via one of more of the antenna elements, such as via the antenna system or devices herein, for example. Additional other examples are also envisioned by which the antenna systems disclosed herein can operate in different frequency ranges, as well as communication and facilitate communications with, or among, one or more wireless components or devices. For example, industrial, scientific and medical (ISM) radio bands, radar band widths, or other ranges of a frequency spectrum can also be facilitated for communications by the antenna systems being disclosed.

Figure 9:
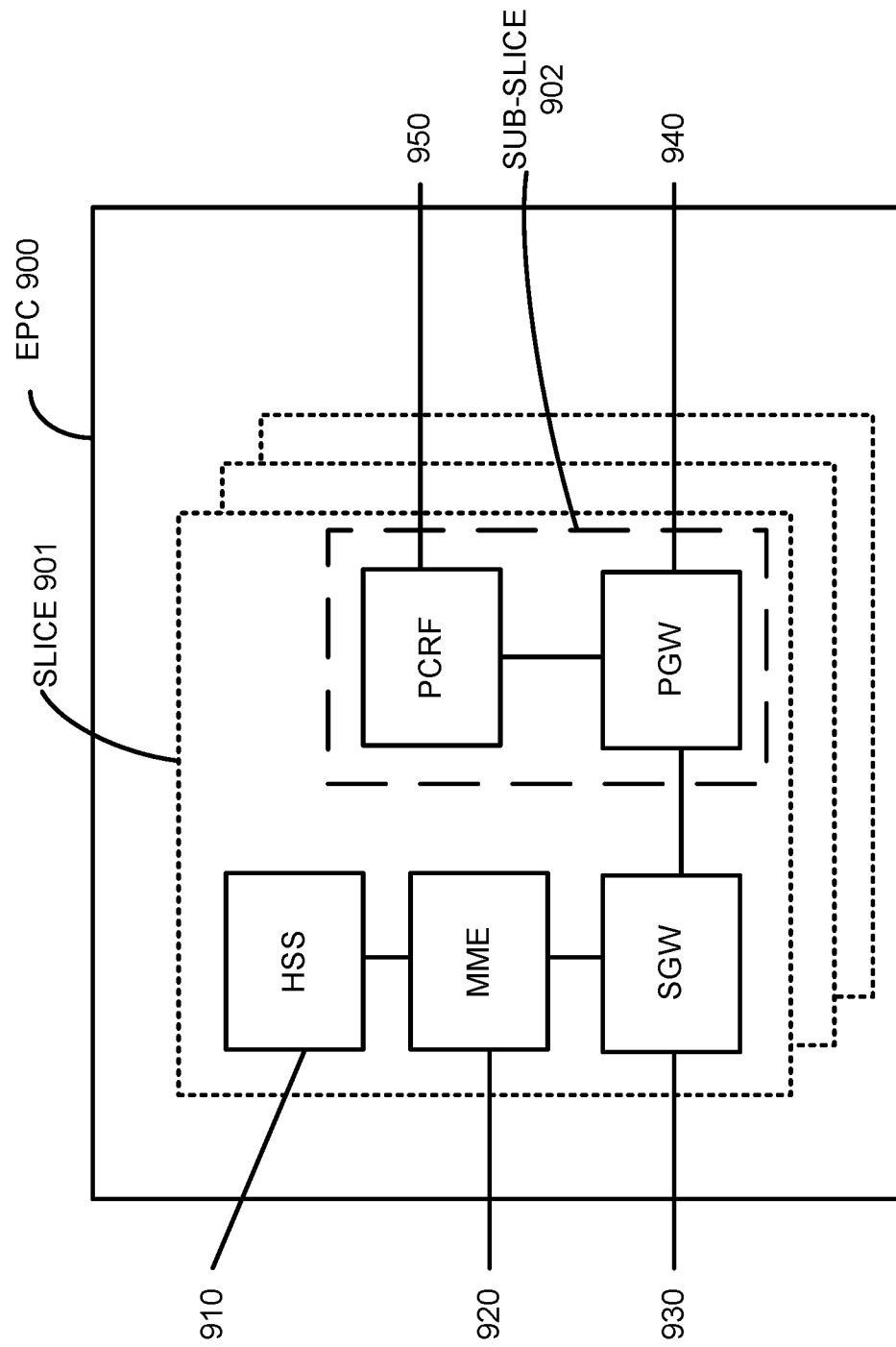
FIG. 9 is a diagram illustrating components of a network in accordance with one or more aspects or embodiments described herein.

Embodiments described herein can be implemented into a system using any suitably configured hardware and/or software. FIG. 9 illustrates components of a network in accordance with some embodiments. In various aspects, part(s) or all of one or more of the components illustrated in connection with the figures herein can be implemented as virtual network functions (VNFs) in connection with various aspects described herein. An Evolved Packet Core (EPC) network 900 is shown to include a Home Subscriber Server (HSS) 910, a Mobility Management Entity (MME) 920, a Serving GateWay (SGW) 930, a Packet Data Network (PDN) GateWay (PGW) 940, a Policy and Charging Rules Function (PCRF) 950.

The HSS 910 comprises one or more databases for network users, including subscription-related information to support the network entities' handling of communication sessions. For example, the HSS 910 may provide support for routing/roaming, authentication, authorization, naming/addressing resolution, location dependencies, etc. The EPC network 900 may comprise one or several HSSs 910, depending on the number of mobile subscribers, on the capacity of the equipment, on the organization of the network, etc.

The MME 920 is similar in function to the control plane of legacy Serving General packet radio service (GPRS) Support Nodes (SGSN). The MMEs 920 manage mobility aspects in access such as gateway selection and tracking area list management. The EPC network 900 may comprise one or several MMEs 920

The SGW 930 terminates the interface toward an Evolved UMTS (Universal Mobile Telecommunications System) Terrestrial Radio Access Network (E-UTRAN), and routes data packets between the E-UTRAN and the EPC network 900. In addition, the SGW 930 may be a local mobility anchor point for inter-eNodeB handovers and also may provide an anchor for inter-3GPP mobility. Other responsibilities may include lawful intercept, charging, and some policy enforcement.

The PGW 940 terminates an SGi interface toward the PDN. The PGW 940 routes data packets between the EPC network 900 and external networks, and may be a node for policy enforcement and charging data collection. The PCRF 950 is the policy and charging control element of the EPC network 900. In a non-roaming scenario, there may be a single PCRF in the Home Public Land Mobile Network (HPLMN) associated with a User Equipment's (UE) Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 950 may be communicatively coupled to an application server (alternatively referred to as application function (AF)). Generally, the application server is an element offering applications that use Internet Protocol (IP) bearer resources with the core network (e.g., UMTS Packet Services (PS) domain, Long Term Evolution (LTE) PS data services, etc.). The application server may signal the PCRF 950 to indicate a new service flow and selecting the appropriate Quality of Service (QoS) and charging parameters. The PCRF 950 may provision this rule into a Policy and Charging Enforcement Function (PCEF) (not shown) with the appropriate traffic flow template (TFT) and QoS class of identifier (QC!), which commences the QoS and charging as specified by the application server.

The components of the EPC 900 may be implemented in one physical node or separate physical nodes. In some embodiments, Network Functions Virtualization (NFV) is utilized to virtualize any or all of the above described network node functions via executable instructions stored in one or more computer readable storage mediums (described in further detail below). A logical instantiation of the EPC network 900 may be referred to as a network slice 901. A logical instantiation of a portion of the EPC network 900 may be referred to as a network sub-slice 902 (e.g., the network sub-slice 902 is shown to include the PGW 940 and the PCRF 950).

Examples may include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus configured to be employed in a service provider (SP) network component of an SP network, comprising: one or more processors, coupled to a memory that includes instructions to execute operations of the one or more processors, configured to: instantiate a virtual access point (vAP) of the SP network associated with a physical access point (pAP) of a customer premise equipment (CPE) based on a community WiFi network to enable a WiFi protected access 2 (WPA2) pass-through; determine a partition configuration of a set of virtual network functions (VNFs) at the vAP from the pAP based on a communication parameter of a communication link to the CPE; and provide the WPA2 pass-through transparently through the pAP from the vAP based on the partition configuration; and a communication interface, coupled to the one or more processors, configured to receive or transmit communication transmissions.

Example 2 includes the subject matter of Example 1, wherein the one or more processors are further configured to: determine the partition configuration by selecting the partition configuration from among a plurality of different partition configurations that correspond to different sets of VNFs configured from the pAP of the CPE to the vAP of the SP network.

Example 3 includes the subject matter of any one of Examples 1-2, including or omitting any elements as optional, wherein the communication parameter comprises a link latency of the communication link to the CPE from the SP network.

Example 4 includes the subject matter of any one of Examples 1-3, including or omitting any elements as optional, wherein the one or more processors are further configured to: measure the communication parameter of the communication link by measuring a wide area network (WAN) link latency from the pAP of the CPE to the SP network based on a ping process.

Example 5 includes the subject matter of any one of Examples 1-4, including or omitting any elements as optional, wherein the one or more processors are further configured to: generate a communication query to the CPE; receive a response from the CPE; and determine the communication parameter comprising a WAN latency by measuring a time based on the communication query and the response from the CPE.

Example 6 includes the subject matter of any one of Examples 1-5, including or omitting any elements as optional, wherein the one or more processors are further configured to: determine, as the partition configuration, a first partition configuration from the set of VNFs in response to the communication parameter comprising a first link latency that is 100 ms or greater than 100 ms; determine, as the partition configuration, a second partition configuration from the set of VNFs in response to the communication parameter comprising a second link latency that is less than 100 ms and greater than 10 ms; and determine, as the partition configuration, a third partition configuration from the set of VNFs in response to the communication parameter comprising a third link latency that is 10 ms, or less than 10 ms.

Example 7 includes the subject matter of any one of Examples 1-6, including or omitting any elements as optional, wherein the first partition configuration comprises: a WiFi AP management component configured to operate one or more policy settings associated with the vAP; a RADIUS client configured to operate one or more authentication processes with an authentication server component; an authenticator component configured to authenticate a user equipment (UE) with the vAP through the pAP on the WPA2 pass-through based on the one or more authentication processes; and a basic service set (BSS) management component configured to operate a channel selection associated with a BSS identification (BSSID) of the community WiFi network for a client authentication and a key derivation.

Example 8 includes the subject matter of any one of Examples 1-7, including or omitting any elements as optional, wherein the second partition configuration comprises the first partition configuration and further comprises: a radio resource control (RRC) component configured to control per client functionalities that include at least one of: setting a data path, transmit parameters including transmit power, modulation coding schemes, a channel width, beamforming groups, or client received signal strength indicators, and control common client functionalities that include at least one of: a dynamic frequency selection, a channel load and coexistence, based on a real-time operation and a hard-real time operation; an internet protocol security (IP-SEC) component configured to control internet protocol (IP) communications and an IP security of the IP communications; and a generic routing encapsulation (GRE) configured to control GRE tunneling protocols for data packets; and wherein the third partition configuration comprises the first partition configuration, the second partition configuration, and operations related to the second partition configuration that are further associated with hard-real time data path functions.

Example 9 includes the subject matter of any one of Examples 1-8, including or omitting any elements as optional, wherein the one or more processors are further configured to: modify the partition configuration of the set of VNFs between the vAP and the pAP to a different partition configuration that includes a different number of VNFs in response to a change in a latency value from among a first plurality of latency values to a second plurality of latency values of the communication parameter.

Example 10 includes the subject matter of any one of Examples 1-9, including or omitting any elements as optional, wherein the one or more processors are further configured to: receive transparently via the WPA2 pass-through a set of unmodified traffic data from a user equipment (UE) and through the community WiFi network of the CPE to enable an authentication protocol or a decryption of the set of unmodified traffic data, only at the vAP.

Example 11 includes the subject matter of any one of Examples 1-10, including or omitting any elements as optional, wherein the one or more processors are further configured to: generate a plurality of WPA2 pass-through interfaces to connect a plurality of user equipments (UEs) to a plurality of vAPs of a virtual community WiFi network over the CPE, wherein the plurality of vAPs are associated with the pAP of the CPE a part from a residential network of the CPE, and comprise different layer 2 media access control (MAC) addresses.

Example 12 is a system to be employed in a service provider (SP) network, comprising: one or more processors configured to execute executable instructions stored in a memory that execute one or more executable components comprising: a virtual network function (VNF) orchestrator component configured to generate an instance of a partition configuration of a set of virtual network functions (VNFs) at a virtual Access Point (vAP) of the SP network from a physical access point (pAP) of a customer premise equipment (CPE) based on a communication parameter of a communication link to the CPE; and a WiFi protected access 2 (WPA2) pass-through component configured to transparently generate a WPA2 pass-through through the pAP from the vAP according to the partition and based on based on a community WiFi network configured at the CPE; and a communication interface, coupled to the one or more processors, configured to receive or transmit communication transmissions.

Example 13 includes the subject matter of Example 12, including or omitting any elements as optional, wherein the one or more executable components further comprise: a measuring component configured to determine the communication parameter of the communication link by measuring a wide area network (WAN) link latency from the pAP of the CPE to the SP network based on a pinging communication protocol.

Example 14 includes the subject matter of any one of Examples 12-13, including or omitting any elements as optional, wherein the measuring component is further configured to generate a communication to the CPE, receive a response from the CPE, and measure the WAN latency by measuring a time between the communication and the response from the CPE.

Example 15 includes the subject matter of any one of Examples 12-14, including or omitting any elements as optional, wherein the VNF orchestrator component is further configured to select the partition configuration as a first partition configuration based on the communication parameter comprising a first value, wherein the first partition configuration includes a plurality of non-real time operations of the pAP associated with the community WiFi network at the CPE, and moving the plurality of non-real time operations from the pAP to the vAP of the SP network.

Example 16 includes the subject matter of any one of Examples 12-15, including or omitting any elements as optional, wherein the VNF orchestrator component is further configured to select the partition configuration as a second partition configuration based on the communication parameter comprising a second value, wherein the second partition configuration includes the plurality of non-real time operations and a plurality of real time operations of the pAP associated with the community WiFi network at the CPE, and moving the plurality of non-real time operations and the plurality of real-time operations from the pAP to the vAP of the SP network.

Example 17 includes the subject matter of any one of Examples 12-16, including or omitting any elements as optional, wherein the VNF orchestrator component is further configured to select the partition configuration as a third partition configuration based on the communication parameter comprising a third value, wherein the third partition configuration includes the plurality of non-real time operations, a plurality of real time operations, and a plurality of hard-real time operations of the pAP associated with the community WiFi network at the CPE, and moving the plurality of non-real time operations, the plurality of real-time operations, and the plurality of hard real time operations from the pAP to the vAP of the SP network Example 18 includes the subject matter of any one of Examples 12-17, including or omitting any elements as optional, wherein the VNF orchestrator component is further configured to determine the partition configuration, based on the communication parameter, from among the set of VNFs comprising non-real time operations, real time operations and hard real time operations, wherein partition configuration comprises the non-real time operations including generating one or more policy settings associated with the vAP by a WiFi AP management component, generating an authentication process by a RADIUS client, authenticating a user equipment (UE) for connection to the WPA2 pass-through to the vAP, and generate a channel selection associated with a BSS identification (BSSID) of the community WiFi network for a client authentication and a key derivation.

Example 19 includes the subject matter of any one of Examples 12-18, including or omitting any elements as optional, wherein the real-time operations include: radio resource control (RRC) operations comprising per client functionalities including at least one of: setting a data path, transmit parameters including transmit power, modulation coding schemes, a channel width, beamforming groups, or client received signal strength indicators, and common client functionalities that include at least one of: a dynamic frequency selection, a channel load and coexistence, based on a real-time operation and a non-real time operation; internet protocol (IP) communications of an internet protocol security (IPSEC) tunnel; an GRE tunneling protocols for data packets; and wherein the third partition configuration comprises the first partition configuration, the second partition configuration, and operations related to the second partition configuration that are further associated with hard-real time data path functions.

Example 20 is a computer-readable storage medium storing executable instructions that, in response to execution, cause one or more processors of a service provider (SP) network component to perform operations comprising: determining a partition configuration of a set of virtual network functions (VNFs) to be configured at a virtual access point (vAP) of the SP network from a physical access point (pAP) of a customer premise equipment (CPE) based on a communication parameter of a communication link to the CPE; instantiating the vAP of the SP network based on a community WiFi network to enable a WiFi protected access 2 (WPA2) pass-through; and enabling the WPA2 pass-through transparently through the pAP from the vAP.

Example 21 includes the subject matter of Example 20, including or omitting any elements as optional, wherein the operations further comprise: modifying the partition configuration of from the set of VNFs by removing operations associated with the pAP of the community WiFi network from the pAP to the vAP in response to a change in a latency value of the communication link.

Example 22 includes the subject matter of any one of Examples 20-21, including or omitting any elements as optional, wherein the operations further comprise: measuring the communication parameter of the communication link by measuring a wide area network (WAN) link latency from the pAP of the CPE to the SP network based on a ping query.

Example 23 includes the subject matter of any one of Examples 20-22, including or omitting any elements as optional, wherein the operations further comprise: configuring a first partition configuration from the set of VNFs when a link latency is 100 ms or greater; configuring a second partition configuration from the set of VNFs when the link latency is less than 100 ms and greater than 10 ms; and configuring a third partition configuration from the set of VNFs when the link latency is 10 ms, or less than 10 ms.

Example 24 includes the subject matter of any one of Examples 20-23, including or omitting any elements as optional, wherein the third partition configuration comprises a hard-real time VNF, the second partition configuration comprise a real-time VNF and the first partition comprises a non-real time VNF.

Example 25 includes the subject matter of any one of Examples 20-24, including or omitting any elements as optional, wherein the operations further comprise: receiving transparently via the WPA2 pass-through a set of unmodified traffic data from a user equipment (UE) and through the community WiFi network of the CPE to enable an authentication protocol or a decryption of the set of unmodified traffic data, only at the vAP.

Example 26 is an apparatus of a service provider (SP) network component comprising: means for determining a partition configuration of a set of virtual network functions (VNFs) to be configured at a virtual access point (vAP) of the SP network from a physical access point (pAP) of a customer premise equipment (CPE) based on a communication parameter of a communication link to the CPE; means for instantiating the vAP of the SP network based on a community WiFi network to enable a WiFi protected access 2 (WPA2) pass-through; and means for enabling the WPA2 pass-through transparently through the pAP from the vAP.

Example 27 includes the subject matter of Example 26, including or omitting any elements as optional, further comprising: means for modifying the partition configuration of from the set of VNFs by removing operations associated with the pAP of the community WiFi network from the pAP to the vAP in response to a change in a latency value of the communication link.

Example 28 includes the subject matter of any one of Examples 26-27, including or omitting any elements as optional, further comprising: means for measuring the communication parameter of the communication link by measuring a wide area network (WAN) link latency from the pAP of the CPE to the SP network based on a ping query.

Example 29 includes the subject matter of any one of Examples 26-28, including or omitting any elements as optional, further comprising: means for configuring a first partition configuration from the set of VNFs when a link latency is 100 ms or greater; means for configuring a second partition configuration from the set of VNFs when the link latency is less than 100 ms and greater than 10 ms; and means for configuring a third partition configuration from the set of VNFs when the link latency is 10 ms, or less than 10 ms.

Example 30 includes the subject matter of any one of Examples 26-29, including or omitting any elements as optional, wherein the third partition configuration comprises a hard-real time VNF, the second partition configuration comprise a real-time VNF and the first partition comprises a non-real time VNF.

Example 31 includes the subject matter of any one of Examples 26-30, including or omitting any elements as optional, further comprising: means for receiving transparently via the WPA2 pass-through a set of unmodified traffic data from a user equipment (UE) and through the community WiFi network of the CPE to enable an authentication protocol or a decryption of the set of unmodified traffic data, only at the vAP.

Example 32 is an apparatus configured to be employed in a service provider (SP) network device, comprising: one or more processors, coupled to a memory that includes instructions to execute operations of the one or more processors, configured to: initiate a WiFi protected access 2 (WPA2) pass-through interface with a user equipment (UE); receive, via the WPA2 pass-through interface, a set of encrypted data from the UE, wherein the set of encrypted data is associated with a community WiFi network; and generate, via the WPA2 pass-through interface, an authentication protocol with the UE based on a virtual network function (VNF) of a physical access point (pAP) associated with the community WiFi network for a virtual access point (vAP) of an SP network of the SP network device.

Example 33 includes the subject matter of Examples 32, including or omitting any elements as optional, wherein the one or more processors are further configured to: generate, via the WPA2 pass-through interface, the authentication protocol with the UE and the vAP by passing communications through a residential gateway node that comprises the pAP associated with the community WiFi network.

Example 34 includes the subject matter of any one of Examples 32-33, including or omitting any elements as optional, wherein the one or more processors are further configured to: receive, transmit, or receive and transmit data traffic that is unmodified through the WPA2 pass-through interface over the residential gateway node.

Example 35 includes the subject matter of any one of Examples 32-34, including or omitting any elements as optional, wherein the WPA2 pass-through interface with the UE is configured to enable communication of data traffic from the UE through a residential gateway node without authentication of the data traffic at the residential gateway node.

Example 36 includes the subject matter of any one of Examples 32-35, including or omitting any elements as optional, wherein the one or more processors are further configured to: in response to a successful authentication from the authentication protocol, receive, via the WPA2 pass-through interface, data traffic associated with only one basic service set (BSS) from among a plurality of BSSs with a layer 2 privacy through a residential gateway node, wherein the BSS is based on a BSS identification (BSSID) associated with the community WiFi network.

Example 37 includes the subject matter of any one of Examples 32-36, including or omitting any elements as optional, wherein the one or more processors are further configured to: enable, via the WPA2 pass-through interface, a key exchange as a part of the authentication protocol between the vAP of the SP network and the UE, and a decryption only at the vAP of the SP network device.

Example 38 includes the subject matter of any one of Examples 32-37, including or omitting any elements as optional, wherein the key exchange comprises an advanced encryption standard (AES) based on a cipher block chaining message authentication code protocol (AES-CCMP) encryption.

Example 39 includes the subject matter of any one of Examples 32-38, including or omitting any elements as optional, wherein the WPA2 pass-through interface is configured to enable an end-to-end interface between the UE and the vAP of the SP network, and wherein the vAP is configured to enable a virtual WPA2 community WiFi network as the SP network through a residential gateway node comprising the pAP and a range output coupled to a ranger extender configured to extend a range of the community WiFi network and further include one or more UEs without access to a residential network of the residential gateway node.

Example 40 includes the subject matter of any one of Examples 32-40, including or omitting any elements as optional, wherein the SP network device comprises a Home Subscriber Server (HSS)/a Mobility Management Entity (MME)/a Serving GateWay (SGW)/a Packet Data Network (PDN) GateWay (PGW)/a Policy and Charging Rules Function (PCRF)/a WiFi access point management (WAPM)/a Radius Client/an authenticator/a BSS management.

Example 41 includes the subject matter of any one of Examples 32-41, including or omitting any elements as optional, wherein the one or more processors are further configured to: generate the WPA2 pass-through interface to connect the UE to the SP network at the vAP over the residential gateway node based on the authentication protocol, wherein the SP network comprises an intranet of a remote access gateway node that is configured to be accessed by the UE with data traffic through the WPA2 pass-through interface that is separate from and transparent to residential data traffic of a residential network managed by the residential gateway node.

Example 42 includes the subject matter of any one of Examples 32-41, including or omitting any elements as optional, wherein the one or more processors are further configured to: generate a plurality of WPA2 pass-through interfaces to connect a plurality of UEs to a plurality of vAPs of virtual community WiFi networks over the residential gateway node, wherein the plurality of vAPs are coupled to the pAP of the residential gateway node and comprise different layer 2 media access control (MAC) addresses.

Example 43 is an apparatus configured to be employed in a user equipment (UE) comprising: one or more processors, coupled to a memory that includes instructions to execute operations of the one or more processors, configured to: detect a community WiFi network over a residential gateway; initiate a WiFi protected access 2 (WPA2) pass-through via a physical access point (pAP) of the residential gateway by connecting with the community WiFi network associated with an SP network at a virtual access point (vAP); and communicate transparently via the WPA2 pass-through a set of encrypted data to enable an authentication protocol at the vAP through the residential gateway unmodified and enable a decryption at the vAP.

Example 44 includes the subject matter of Example 43, including or omitting any elements as optional, wherein the UE comprises a first encryption key associated with a residential gateway AP of a residential network managed by the residential gateway, wherein the first encryption key is separate and different from a second encryption key of the set of encrypted data associated with the community WiFi network.

Example 45 includes the subject matter of any one of Examples 43-44, including or omitting any elements as optional, wherein the one or more processors are further configured to: in response to a successful authentication from the authentication protocol, transmit, via the WPA2 pass-through, data traffic that is associated with a basic service set (BSS) having a layer 2 privacy through the residential gateway node, wherein the BSS is based on a BSS identification (BSSID) of the community WiFi network.

Example 46 includes the subject matter of any one of Examples 43-45, including or omitting any elements as optional, wherein the one or more processors are further configured to: enable, via the WPA2 pass-through, a key exchange as a part of the authentication protocol between the vAP of the SP network and the UE, wherein the WPA2 pass-through is configured to extend from a communication component of the UE, through the pAP of the residential gateway and to the vAP of the SP network to enable an end-to-end secure traffic data flow there-between.

Example 47 includes the subject matter of any one of Examples 43-46, including or omitting any elements as optional, wherein the SP network comprises an intranet of a remote access gateway node that is configured to be accessed by the UE with data traffic through the WPA2 pass-through that is separated from and transparent to residential data traffic of a residential network managed by the residential gateway node.

Example 48 is a computer-readable storage medium storing executable instructions that, in response to execution, cause one or more processors of a service provider (SP) network device to perform operations comprising: initiating a WiFi protected access 2 (WPA2) pass-through via a customer premise equipment (CPE) to a user equipment (UE); and receiving, via the WPA2 pass-through, a set of traffic data from the UE, wherein the set of traffic data is unmodified by the CPE and associated with a community WiFi network of the CPE.

Example 49 includes the subject matter of Example 48, including or omitting any elements as optional, wherein the operations further comprise: generating, via the WPA2 pass-through, an authentication protocol with one or more encrypted data of the set of traffic data with the UE based on a virtual network function (VNF) of a physical access point (pAP) of the community WiFi network for a virtual access point (vAP) of an SP network of the SP network device.

Example 50 includes the subject matter of any one of Examples 48-49, including or omitting any elements as optional, wherein the operations further comprise: receiving, via the WPA2 pass-through, data only associated with a basic service set (BSS) of a plurality of different BSSs with Layer 2 privacy configured at the CPE, wherein the BSS is based on a BSS identification (BSSID) of a pAP for the community WiFi network.

Example 51 includes the subject matter of any one of Examples 48-50, including or omitting any elements as optional, wherein the operations further comprise: enabling, via the WPA2 pass-through, a key exchange between a vAP of an SP network and the UE, and a decryption of the key exchange only at the vAP of the SP network device.

Example 52 includes the subject matter of any one of Examples 48-51, including or omitting any elements as optional, wherein the SP network comprises an intranet of a remote access gateway node that is configured to be accessed by the UE with data traffic through the WPA2 pass-through that is separate from and transparent to residential data traffic of a residential network managed by the CPE.

Example 53 includes the subject matter of any one of Examples 48-52, including or omitting any elements as optional, wherein the SP network device comprises at least one of a WiFi access point management (WAPM)/a Radius Client/an authenticator/a BSS management.

Example 54 is a computer-readable storage medium storing executable instructions that, in response to execution, cause one or more processors of a user equipment (UE) network device to perform operations comprising: detecting a community WiFi network over a residential gateway; initiating a WiFi protected access 2 (WPA2) pass-through via a physical access point (pAP) of the residential gateway by connecting with the community WiFi network associated with an SP network at a virtual access point (vAP); and communicating transparently via the WPA2 pass-through a set of encrypted data to enable an authentication protocol at the vAP through the residential gateway unmodified and enable a decryption at the vAP.

Example 55 includes the subject matter of Example 54, including or omitting any elements as optional, wherein the operations further comprise: communicating or generating a first encryption key associated with a residential gateway AP of a residential network managed by the residential gateway, wherein the first encryption key is separate and different from a second encryption key of the set of encrypted data associated with the community WiFi network.

Example 56 includes the subject matter of any one of Examples 54-55, including or omitting any elements as optional, wherein the operations further comprise: in response to a successful authentication from the authentication protocol, transmitting, via the WPA2 pass-through, data traffic that is associated with a basic service set (BSS) having a layer 2 privacy through the residential gateway node, wherein the BSS is based on a BSS identification (BSSID) of the community WiFi network.

Example 57 includes the subject matter of any one of Examples 54-56, including or omitting any elements as optional, wherein the operations further comprise: enabling, via the WPA2 pass-through, a key exchange as a part of the authentication protocol between the vAP of the SP network and the UE, wherein the WPA2 pass-through is configured to extend from a communication component of the UE, through the pAP of the residential gateway and to the vAP of the SP network to enable an end-to-end secure traffic data flow there-between.

Example 58 includes the subject matter of any one of Examples 54-57, including or omitting any elements as optional, wherein the SP network comprises an intranet of a remote access gateway node that is configured to be accessed by the UE with data traffic through the WPA2 pass-through that is separated from and transparent to residential data traffic of a residential network managed by the residential gateway node.

Example 59 is an apparatus of a service provider (SP) network device comprising: means for initiating a WiFi protected access 2 (WPA2) pass-through via a customer premise equipment (CPE) to a user equipment (UE); and means for receiving, via the WPA2 pass-through, a set of traffic data from the UE, wherein the set of traffic data is unmodified by the CPE and associated with a community WiFi network of the CPE.

Example 60 includes the subject matter of Example 59, including or omitting any elements as optional, further comprising: means for generating, via the WPA2 pass-through, an authentication protocol with one or more encrypted data of the set of traffic data with the UE based on a virtual network function (VNF) of a physical access point (pAP) of the community WiFi network for a virtual access point (vAP) of an SP network of the SP network device.

Example 61 includes the subject matter of any one of Examples 59-60, including or omitting any elements as optional, further comprising: means for receiving, via the WPA2 pass-through, data only associated with a basic service set (BSS) of a plurality of different BSSs with Layer 2 privacy configured at the CPE, wherein the BSS is based on a BSS identification (BSSID) of a pAP for the community WiFi network.

Example 62 includes the subject matter of any one of Examples 59-61, including or omitting any elements as optional, further comprising: means for enabling, via the WPA2 pass-through, a key exchange between a vAP of an SP network and the UE, and a decryption of the key exchange only at the vAP of the SP network device.

Example 63 includes the subject matter of any one of Examples 59-62, including or omitting any elements as optional, wherein the SP network comprises an intranet of a remote access gateway node that is configured to be accessed by the UE with data traffic through the WPA2 pass-through that is separate from and transparent to residential data traffic of a residential network managed by the CPE.

Example 64 includes the subject matter of any one of Examples 59-63, including or omitting any elements as optional, wherein the SP network device comprises at least one of a WiFi access point management (WAPM)/a Radius Client/an authenticator/a BSS management.

Example 65 is an apparatus of a user equipment (UE) network device comprising: means for detecting a community WiFi network over a residential gateway; means for initiating a WiFi protected access 2 (WPA2) pass-through via a physical access point (pAP) of the residential gateway by connecting with the community WiFi network associated with an SP network at a virtual access point (vAP); and means for communicating transparently via the WPA2 pass-through a set of encrypted data to enable an authentication protocol at the vAP through the residential gateway unmodified and enable a decryption at the vAP.

Example 66 includes the subject matter of Example 65, including or omitting any elements as optional, further comprising: means for communicating or generating a first encryption key associated with a residential gateway AP of a residential network managed by the residential gateway, wherein the first encryption key is separate and different from a second encryption key of the set of encrypted data associated with the community WiFi network.

Example 67 includes the subject matter of any one of Examples 65-66, including or omitting any elements as optional, further comprising: means for transmitting, in response to a successful authentication from the authentication protocol, via the WPA2 pass-through, data traffic that is associated with a basic service set (BSS) having a layer 2 privacy through the residential gateway node, wherein the BSS is based on a BSS identification (BSSID) of the community WiFi network.

Example 68 includes the subject matter of any one of Examples 65-67, including or omitting any elements as optional, further comprising: means for enabling, via the WPA2 pass-through, a key exchange as a part of the authentication protocol between the vAP of the SP network and the UE, wherein the WPA2 pass-through is configured to extend from a communication component of the UE, through the pAP of the residential gateway and to the vAP of the SP network to enable an end-to-end secure traffic data flow there-between.

Example 69 includes the subject matter of any one of Examples 65-68, including or omitting any elements as optional, wherein the SP network comprises an intranet of a remote access gateway node that is configured to be accessed by the UE with data traffic through the WPA2 pass-through that is separated from and transparent to residential data traffic of a residential network managed by the residential gateway node.

Example 70 is an apparatus configured to be employed in a service provider (SP) network device, comprising: one or more processors, coupled to a memory that includes instructions to execute operations of the one or more processors, configured to: initiate a WiFi protected access 2 (WPA2) pass-through interface with a user equipment (UE); receive, via the WPA2 pass-through interface, a set of encrypted data from the UE, wherein the set of encrypted data is associated with a community WiFi network; and generate, via the WPA2 pass-through interface, an authentication protocol with the UE based on a virtual network function (VNF) of a physical access point (pAP) associated with the community WiFi network for a virtual access point (vAP) of an SP network of the SP network device; and a communication interface, coupled to the one or more processors, configured to receive or transmit communication transmissions.

Example 71 is an apparatus configured to be employed in a user equipment (UE) comprising: one or more processors, coupled to a memory that includes instructions to execute operations of the one or more processors, configured to: detect a community WiFi network over a residential gateway; initiate a WiFi protected access 2 (WPA2) pass-through via a physical access point (pAP) of the residential gateway by connecting with the community WiFi network associated with an SP network at a virtual access point (vAP); and communicate transparently via the WPA2 pass-through a set of encrypted data to enable an authentication protocol at the vAP through the residential gateway unmodified and enable a decryption at the vAP; a radio frequency (RF) interface, coupled to the one or more processors, configured to receive or transmit communication transmissions.

Applications (e.g., program modules) can include routines, programs, components, data structures, etc., that perform particular tasks or implement particular abstract data types. Moreover, those skilled in the art will appreciate that the operations disclosed can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated mobile or personal computing devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media (e.g., one or more data stores) can include, but is not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the acts and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques, such as millimeter wave bands in the range of 30 GHz to 300 GHz, for example.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the acts and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the acts and/or actions of a method or algorithm may reside as one or any combination or set of codes and/or instructions on a machine-readable medium and/or computer readable medium, which may be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

The invention claimed is:

1. An apparatus, comprising:

one or more processors, coupled to a memory that includes instructions to execute operations of the one or more processors, configured to:

instantiate a virtual access point (vAP) of a network associated with a physical access point (pAP) of a customer premise equipment (CPE) based on a community wireless network to enable a security pass-through;

determine a configuration of a set of virtual network functions (VNFs) at the vAP from the pAP based on a communication parameter of a communication link to the CPE; and provide the security pass-through transparently through the pAP from the vAP based on the configuration; and a communication interface, coupled to the one or more processors, configured to receive or transmit communication transmissions.

2. The apparatus of claim 1, wherein the one or more processors are further configured to:

determine the configuration by selecting the configuration from among a plurality of different configurations that correspond to different sets of VNFs configured from the pAP of the CPE to the vAP of the network.

3. The apparatus of claim 1, wherein the communication parameter comprises a link latency of the communication link to the CPE from the network.

4. The apparatus of claim 1, wherein the one or more processors are further configured to:

measure the communication parameter of the communication link by measuring a wide area network (WAN) link latency from the pAP of the CPE to the network based on a ping process.

5. The apparatus of claim 1, wherein the one or more processors are further configured to:
generate a communication query to the CPE;
receive a response from the CPE; and
determine the communication parameter comprising a WAN latency by measuring a time based on the communication query and the response from the CPE.

6. The apparatus of claim 1, wherein the one or more processors are further configured to:
determine, as the configuration, a first configuration from the set of VNFs in response to the communication parameter comprising a first link latency that is greater than a threshold latency;
determine, as the configuration, a second configuration from the set of VNFs in response to the communication parameter comprising a second link latency that is less than the threshold latency; and
determine, as the configuration, a third configuration from the set of VNFs in response to the communication parameter comprising a third link latency that is less than a second threshold latency.

7. The apparatus of claim 6, wherein the first configuration comprises:
a wireless AP management component configured to operate one or more policy settings associated with the vAP;
a RADIUS client configured to operate one or more authentication processes with an authentication server component;
an authenticator component configured to authenticate a user equipment (UE) with the vAP through the pAP on the security pass-through based on the one or more authentication processes; and
a basic service set (BSS) management component configured to operate a channel selection associated with a BSS identification (BSSID) of the community wireless network for a client authentication and a key derivation.

8. The apparatus of claim 7, wherein the second configuration comprises the first configuration and further comprises:
a radio resource control (RRC) component configured to control per client functionalities that include at least one of: setting a data path, transmit parameters including transmit power, modulation coding schemes, a channel width, beamforming groups, or client received signal strength indicators, and control common client functionalities that include at least one of: a dynamic frequency selection, a channel load and coexistence, based on a real-time operation and a hard-real time operation;
an internet protocol security (IPSEC) component configured to control internet protocol (IP) communications and an IP security of the IP communications; and
a generic routing encapsulation (GRE) component configured to control GRE tunneling protocols for data packets; and
wherein the third configuration comprises the first configuration, the second configuration, and operations related to the second configuration that are further associated with hard-real time data path functions.

9. The apparatus of claim 1, wherein the one or more processors are further configured to:
modify the configuration of the set of VNFs between the vAP and the pAP to a different configuration that includes a different number of VNFs in response to a change in a latency value from among a first plurality of latency values to a second plurality of latency values of the communication parameter.

10. The apparatus of claim 1, wherein the one or more processors are further configured to:
receive transparently via the security pass-through a set of unmodified traffic data from a user equipment (UE) and through the community wireless network of the CPE to enable an authentication protocol or a decryption of the set of unmodified traffic data, only at the vAP.

11. The apparatus of claim 1, wherein the one or more processors are further configured to:
generate a plurality of security pass-through interfaces to connect a plurality of user equipments (UEs) to a plurality of vAPs of a virtual community wireless network over the CPE, wherein the plurality of vAPs are associated with the pAP of the CPE a part from a residential network of the CPE, and comprise different layer 2 media access control (MAC) addresses.

12. A system, comprising:
one or more processors configured to execute executable instructions stored in a memory that execute one or more executable components comprising:
a virtual network function (VNF) orchestrator component configured to generate an instance of a configuration of a set of virtual network functions (VNFs) at a virtual Access Point (vAP) of a network from a physical access point (pAP) of a customer premise equipment (CPE) based on a communication parameter of a communication link to the CPE; and
a security component configured to transparently generate a security pass-through through the pAP from the vAP based on a community wireless network configured at the CPE; and
a communication interface, coupled to the one or more processors, configured to receive or transmit communication transmissions.

13. The system of claim 12, wherein the one or more executable components further comprise:
a measuring component configured to determine the communication parameter of the communication link by measuring a wide area network (WAN) link latency from the pAP of the CPE to the network based on a pinging communication protocol.

14. The system of claim 13, wherein the measuring component is further configured to generate a communication to the CPE, receive a response from the CPE, and measure the WAN latency by measuring a time between the communication and the response from the CPE.

15. The system of claim 12, wherein the VNF orchestrator component is further configured to select the configuration as a first configuration based on the communication parameter comprising a first value, wherein the first configuration includes a plurality of non-real time operations of the pAP associated with the community wireless network at the CPE, and moving the plurality of non-real time operations from the pAP to the vAP of the network.

16. The system of claim 15, wherein the VNF orchestrator component is further configured to select the configuration as a second configuration based on the communication parameter comprising a second value, wherein the second configuration includes the plurality of non-real time operations and a plurality of real time operations of the pAP associated with the community wireless network at the CPE, and moving the plurality of non-real time operations and the plurality of real-time operations from the pAP to the vAP of the network.

17. The system of claim 16, wherein the VNF orchestrator component is further configured to select the configuration as a third configuration based on the communication parameter comprising a third value, wherein the third configuration includes the plurality of non-real time operations, a plurality of real time operations, and a plurality of hard-real time operations of the pAP associated with the community wireless network at the CPE, and moving the plurality of non-real time operations, the plurality of real-time operations, and the plurality of hard real time operations from the pAP to the vAP of the network.

18. The system of claim 12, wherein the VNF orchestrator component is further configured to determine the configuration, based on the communication parameter, from among the set of VNFs comprising non-real time operations, real time operations and hard real time operations, wherein the configuration comprises the non-real time operations including generating one or more policy settings associated with the vAP by a wireless AP management component, generating an authentication process by a RADIUS client, authenticating a user equipment (UE) for connection to the security pass-through to the vAP, and generate a channel selection associated with a BSS identification (BSSID) of the community wireless network for a client authentication and a key derivation.

19. The system of claim 18, wherein the real-time operations include:
- radio resource control (RRC) operations comprising per client functionalities including at least one of: setting a data path, transmit parameters including transmit power, modulation coding schemes, a channel width, beamforming groups, or client received signal strength indicators, and common client functionalities that include at least one of: a dynamic frequency selection, a channel load and coexistence, based on a real-time operation and a non-real time operation;
- internet protocol (IP) communications of an internet protocol security (IPSEC) tunnel; and
- GRE tunneling protocols for data packets; and
- wherein the third configuration comprises the first configuration, the second configuration, and operations related to the second configuration that are further associated with hard-real time data path functions.

20. A non-transitory computer-readable storage medium storing executable instructions that, in response to execution, cause one or more processors of a network component to perform operations comprising:
- determining a configuration of a set of virtual network functions (VNFs) to be configured at a virtual access point (vAP) of a network from a physical access point (pAP) of a customer premise equipment (CPE) based on a communication parameter of a communication link to the CPE;
- instantiating the vAP of the network based on a community wireless network to enable a wireless security pass-through; and
- enabling the security pass-through transparently through the pAP from the vAP.

21. The non-transitory computer-readable storage medium of claim 20, wherein the operations further comprise:
- modifying the configuration of the set of VNFs by removing operations associated with the pAP of the community wireless network from the pAP to the vAP in response to a change in a latency value of the communication link.

22. The non-transitory computer-readable storage medium of claim 20, wherein the operations further comprise:
- measuring the communication parameter of the communication link by measuring a wide area network (WAN) link latency from the pAP of the CPE to the network based on a ping query.

23. The non-transitory computer-readable storage medium of claim 20, wherein the operations further comprise:
- configuring a first configuration from the set of VNFs when a link latency is above a threshold latency;
- configuring a second configuration from the set of VNFs when the link latency is less than the threshold latency; and
- configuring a third configuration from the set of VNFs when the link latency is less than a second threshold latency.

24. The non-transitory computer-readable storage medium of claim 23, wherein the configuration comprises a hard-real time VNF, the configuration comprise a real-time VNF and the comprises a non-real time VNF.

25. The non-transitory computer-readable storage medium of claim 20, wherein the operations further comprise:
- receiving transparently via the security pass-through a set of unmodified traffic data from a user equipment (UE) and through the community wireless network of the CPE to enable an authentication protocol or a decryption of the set of unmodified traffic data, only at the vAP.

* * * * *